United States Patent
Kouchi et al.

[11] Patent Number: 6,026,243
[45] Date of Patent: Feb. 15, 2000

[54] SENSUOUS EXPRESSION TRANSLATION SYSTEM

[75] Inventors: Toshihito Kouchi; Takemasa Shimosato, both of Tokyo; Yasuyuki Ogura, Sagamihara; Shinichi Yoshii, Urawa, all of Japan

[73] Assignee: Olympus Optical Co., Ltd., Tokyo, Japan

[21] Appl. No.: 08/534,122

[22] Filed: Sep. 26, 1995

Related U.S. Application Data

[62] Division of application No. 08/056,065, Apr. 30, 1993, Pat. No. 5,495,602.

[30] Foreign Application Priority Data

Apr. 30, 1992 [JP] Japan ................................ 4-110992

[51] Int. Cl.⁷ .......................................... G06F 17/20
[52] U.S. Cl. ........................ 395/754; 375/751; 375/752
[58] Field of Search .................................. 395/751, 752, 395/754

[56] References Cited

U.S. PATENT DOCUMENTS

| | | |
|---|---|---|
| 4,714,995 | 12/1987 | Materna et al. . |
| 4,864,503 | 9/1989 | Tolin . |
| 5,056,021 | 10/1991 | Ausborn . |
| 5,084,817 | 1/1992 | Kumano et al. . |
| 5,278,978 | 1/1994 | Demers et al. . |
| 5,406,475 | 4/1995 | Kouchi et al. . |

FOREIGN PATENT DOCUMENTS 4-108133  4/1992  Japan .

OTHER PUBLICATIONS

OEP. Office Equipment and Products, vol. 20, No. 156, Sep. 1991, Japan, pp. 44–45, In Full Swing JICFS Operations Enhance Market Efficiency.

OEP. Office Equipment and Products, vol. 20, No. 156, Sep. 1991, Japan, p. 47, Apparel Business Sews Up News Information.

Japan Computer Quarterly, No. 83, 1990, Japan, pp. 3–15, K. Asano, et al, Japan's Distribution System Information Network.

*Primary Examiner*—Gail O. Hayes
*Assistant Examiner*—George N. Stevens
*Attorney, Agent, or Firm*—Frishauf, Holtz, Goodman, Langer & Chick

[57] ABSTRACT

A DB interface is provided between each subscriber database, which stores information associated with each goods including an aesthetic/sensuous attribute unique to each subscriber, and a basic DB, which stores support information for supporting goods planning of each subscriber by electronic processing. The DB interface converts the aesthetic/sensuous attribute to data corresponding to a unified classification and a unified evaluation axis of the basic DB so as to cause the basic DB to fetch the information of each subscriber database as part of the support information.

14 Claims, 24 Drawing Sheets

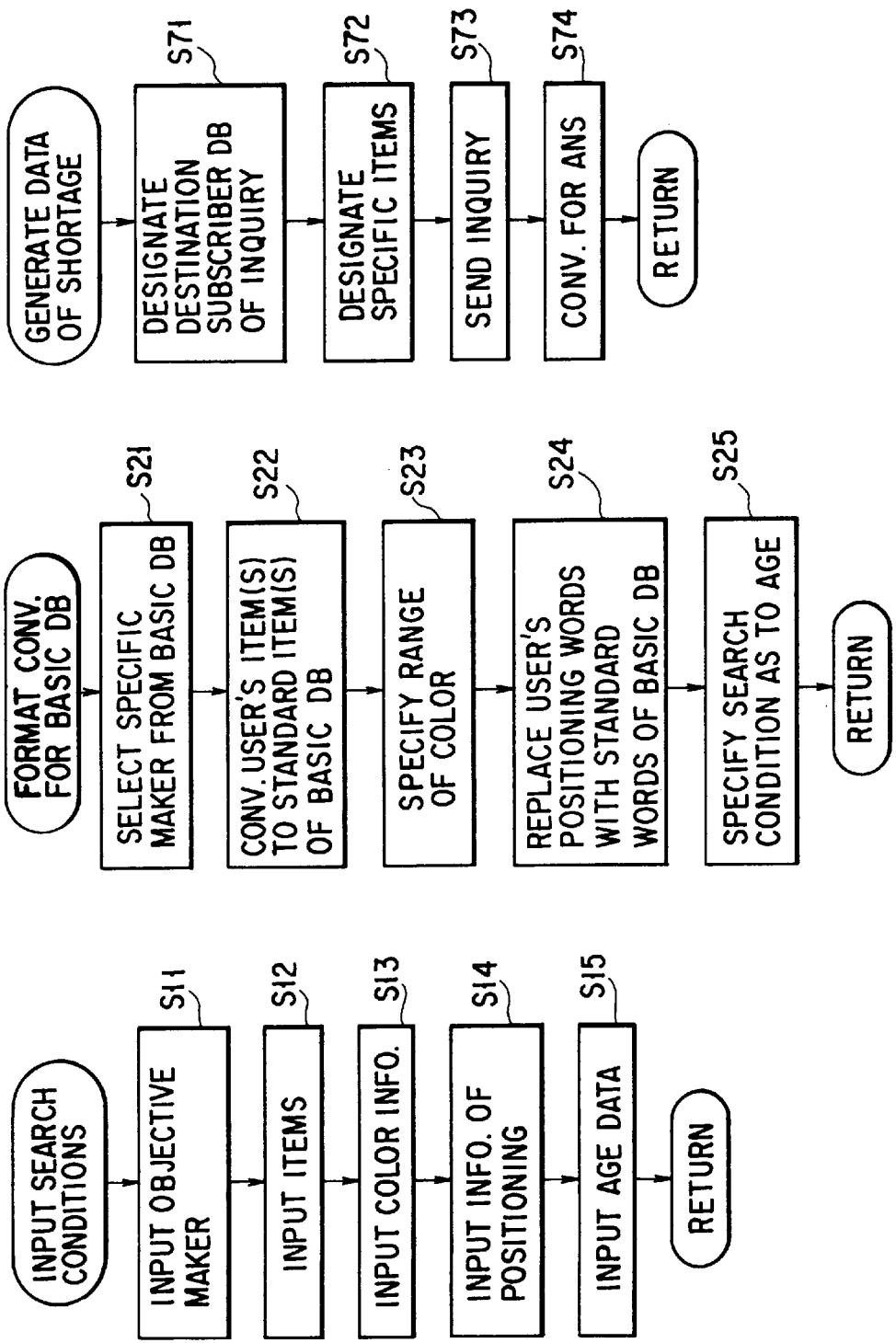

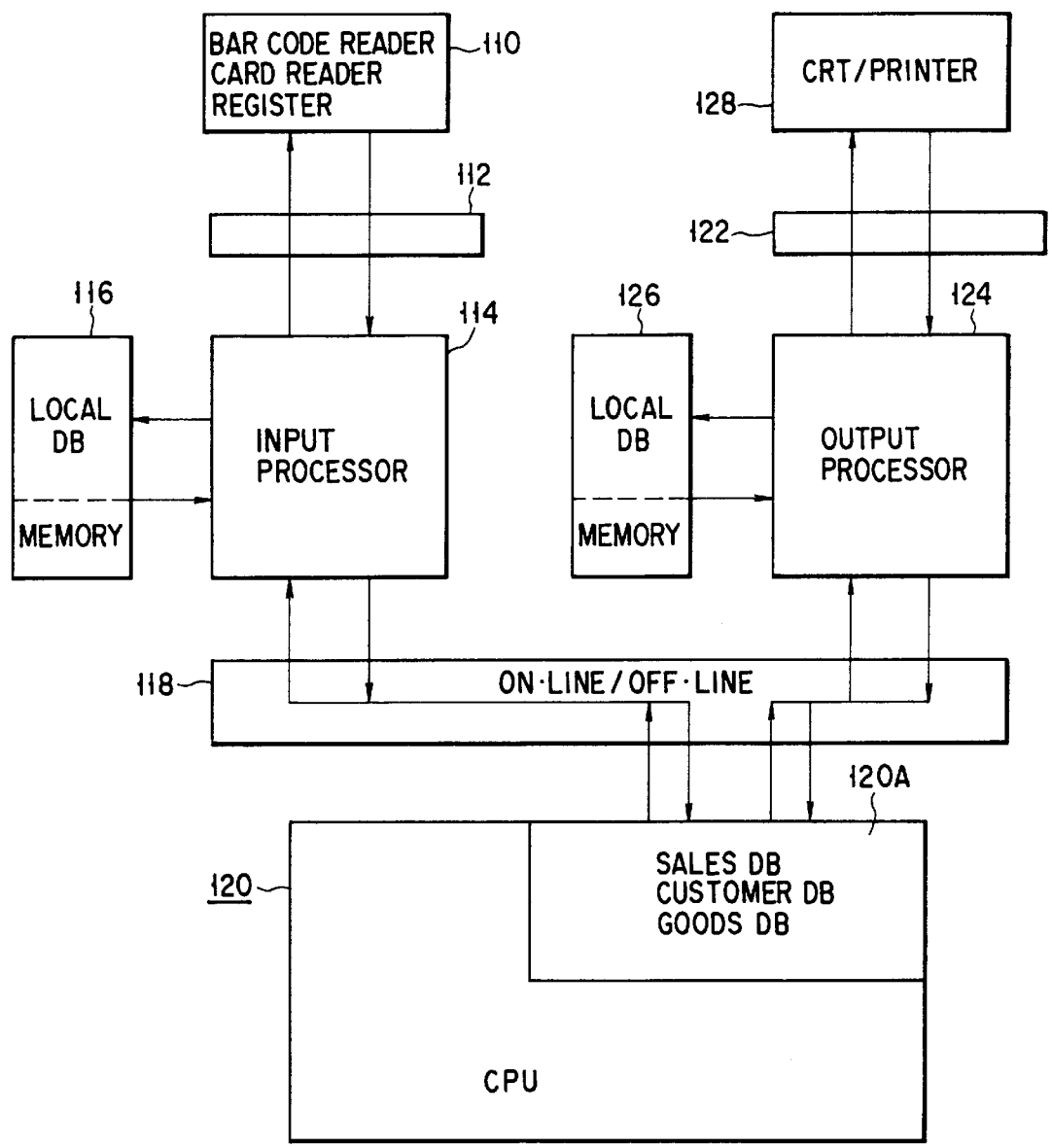
F I G. 6

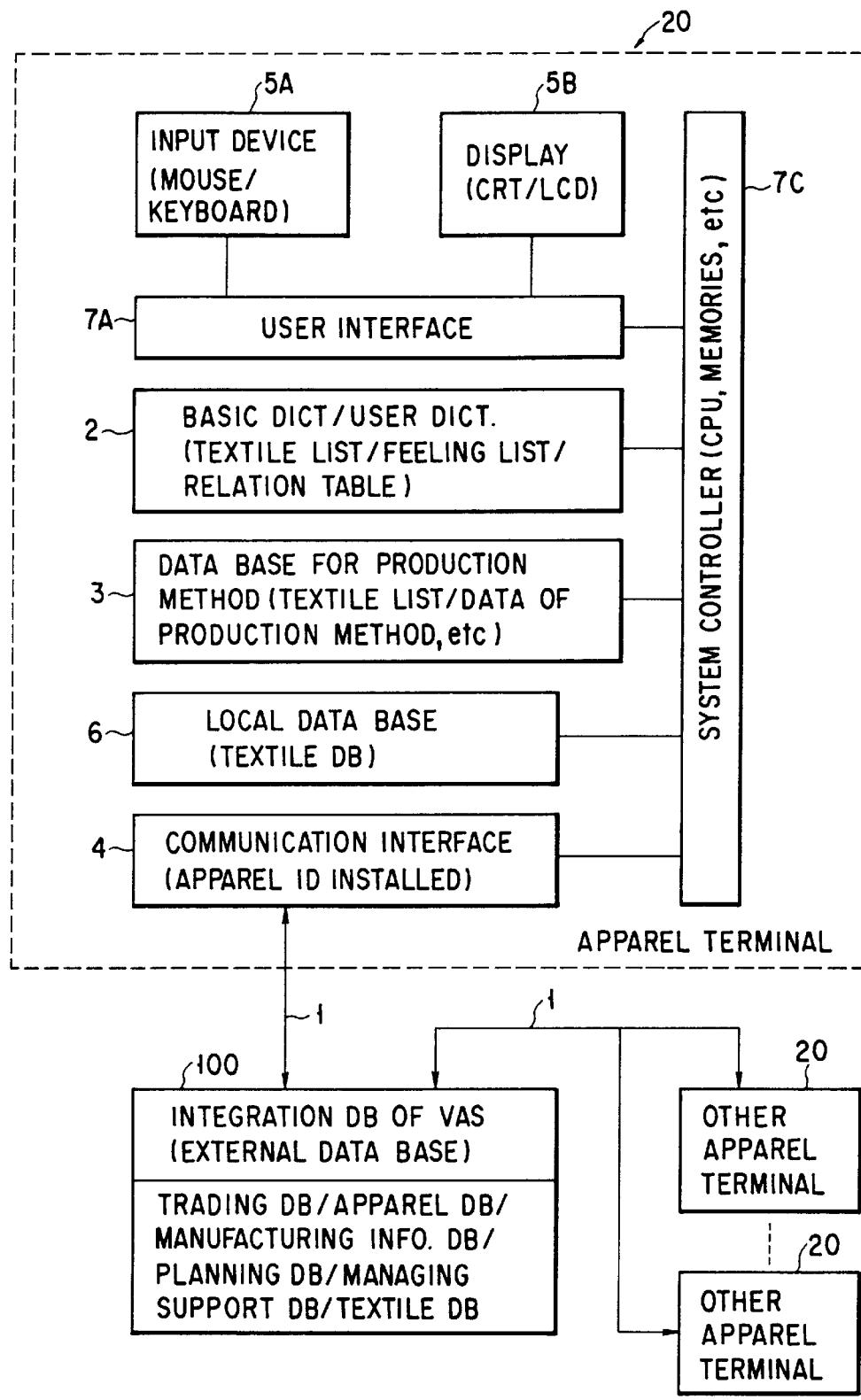
F I G. 7

TEXTILE GOODS INFO. ENTRY TEMPLATE

DATE 1993/02/15

| TEXTILE CODE | 0401000000020 | BRAND CODE | 10000 | APAREL ID | |
|---|---|---|---|---|---|
| CLOTH CODE | 015 | DENIM | COLOR CODE | 20 | ORANGE | PATTERN CODE | 1999 | PREDYED/PLAIN |

IMPRESSION: THICK [ ] THIN [✓]  HARD [ ] SOFT [✓]  DRY [ ] WET [✓]  ROUGH [✓] SMOOTH [ ]

SCROLL ICON ⇔

FEATURE OF CLOTH: CLOTH FOR ADULT SUIT WHICH IS LIGHT, SOFT, AND SOMEWHAT SLIMY

MATERIAL CODE | WO | WOOL | 70% | NY | NYLON | 30%

SUITABLE SEASON | SPRING/SUMMER

NAME OF ACTIVE PARTER

F I G. 8

| APAREL ID | A001 | | |
|---|---|---|---|
| DESIGNER NAME | HANAKO ISHO | 5TH. EDITION | 92/10/01 |
| SEX | FEMALE | AGE | 27 | PESENT | 93/xx/xx |

| NAME OF BASIC CLOTH | DESIGNER'S WORDS | IMPRESSION OR FEELING | CODE OF IMPRESSION |
|---|---|---|---|
| WOOL POPLIN | MODERATE DRAPE | MODERATE DRAPE | xxxxx |
|  | TENSITY & FIRM | FIRM | xxxxx |
|  | SILK-LIKE | RUSTLING | xxxxx |
|  | WOOL | WOOL | xxxxx |
| FLANNEL | SOFT | SOFT | xxxxx |
|  | WARM | WARM | xxxxx |
| CAMEL HAIR | SOFT | SOFT | xxxxx |
|  | LIGHT & FLIMSY | FLOSSY/ FLUFFY | xxxxx |

FIG. 10

| APAREL ID | A001 | | | | |
|---|---|---|---|---|---|
| DESIGNER NAME | HANAKO ISHO | | INITIAL ENTRY 92/03/11 | 5TH. EDITION 92/10/01 | |
| SEX | FEMALE | AGE | 27 | PRESENT 93/05/12 3:25 PM | |
| NAME OF BASIC CLOTH | | MATERIAL | DESIGNER'S WORDS (EXPRESSION OF FEELING) | | PRODUCTION METHOD |
| ANGORA | | WOOL | LIGHT, SOFT, WARM, & FLOSSY | | A0123 |
| WOOL GEOGETTE | | WOOL | DRAPY, SOFT, & MASSIVE | | U3214 |
| WOOL POPLIN | | WOOL | SILK-LIKE, LESS-DRAPY, TENSITY, & FIRM | | U4589 |
| FLANNEL | | WOOL | LIGHT, SOFT, & WARM | | F5792 |
| HOMESPUN | | WOOL | CRUNCHY, ROUGH, WARM, & CHEERFUL | | H6239 |
| SHANTENG | | SILK | STIFF, BULKY, & STARK | | S7691 |
| SATIN | | SILK | LUSTERED, GLOSSY, SLEEK, & GORGEOUS | | S2938 |
| RAME | | SILK | LUSTERED, GLOSSY, SPLENDIDLY-LUSTROUS, & GORGEOUS | | R1973 |
| LACE | | SILK | TRANSPARENT, LIGHT, & FLIMSY | | L6713 |
| TROPICAL (ADDITIONAL ENTRY) | | WOOL | SILK-LIKE, LESS-DRAPY, TENSITY, & FIRM | | T9876 |

F I G. 11

| NAME OF CLOTH | | DATA FOR PRODUCING CLOTH | | | |
|---|---|---|---|---|---|
| WOOL POPLIN | | NUMBER OF TWISTS | | TEXTILE STRUCTURE | INTERTWISTED |
| PRODUCTION METHOD | | DIRECTION OF TWIST | | ARRANGEMENT OF THREADS | WARP: LESS-FLEXIBLE |
| U 4 5 8 9 | | NUMBER OF TWISTED THREADS | | THICKNESS OF THREADS | |
| CLOTH SAMPLE | MATERIAL | METHOD OF TWISTING | | DENSITY | |
| | WOOL 100% | COUNT | | TENSION | |
| | | TWISTING MACHINE | | CONDITIONS IN PRODUCTION | |
| IMAGE DATA OF TEXTILE | | PARALLELISM OF TEXTILES | UNIFORM | FINISH OF ADJ. | GOOD |
| | | VARIATION IN THICKNESS OF THREADS | NO VARIATION | FINISH OF PRODUCTS | GOOD |

F I G. 12

| APAREL ID | A001 | | | | |
|---|---|---|---|---|---|
| DESIGNER | HANAKO ISHO | INITIAL ENTRY 92/03/11 | | 5TH EDITION 92/10/011 | |
| SEX | FEMALE | AGE | 27 | NAME OF CLOTH | BLANK (OR "WOOLPOPLIN" AFTER SEARCHING) |
| TOTAL IMPRESSION (INPUT FOR SEARCH) | | | | LESS-DRAPY, TENSITY/FIRM, LUSTERED, RUSTLING, & WOOL-LIKE | PRIORITY OF KEY WORD |
| GENERAL FEELING | SENSE OF SIGHT | | | LESS-DRAPY | 1ST. KEY |
| | SENSE OF TOUCH | | | TENSITY & FIRM | 2ND. KEY |
| | SENSE OF HEARING | | | RUSTLING (SILK TYPE) | 3RD. KEY |
| | SENSE OF SMELL | | | (UNDEFINED) | —TH. KEY |
| | TEXTILE STRUCTURE | | | WOOL LIKE | 4TH. KEY |
| | BRILLIANCE | | | SHINING/BRIGHTLY | 5TH. KEY |
| | COLOR | | | (UNDEFINED) | —TH. KEY |
| | PATTERN | | | (UNDEFINED) | —TH. KEY |

\* NOTE: "SENSE OF SIGHT" INCLUDES IMPRESSION CAUSED BY COLOR OR PATTERN

FIG. 13

| APAREL ID | A001 | | | |
|---|---|---|---|---|
| DESIGNER | HANAKO ISHO | | INITIAL ENTRY xx/xx/xx | 1ST EDITION xx/xx/xx |
| SEX | FEMALE | AGE 27 | PRESENT 93/05/12 3:25PM | |
| DESIGNER'S WORDS (EXPRESSION OF FEELING) | | | LIST OF BASIC CLOTHES (BEFORE LEARNING/MODIFIED) | |
| 1ST KEY | 2ND KEY | 1ST CANDIDATE | 2ND CANDIDATE | MATERIAL OF 1ST CANDIDATE | PRODUCTION METHOD OF 1ST CANDIDATE |
| SOFT | WARM | MELTON | FLANNEL | WOOL | M8642 |
| | FLOSSY | CAMEL HAIR | ANGORA | WOOL | K6927 |
| | MASSIVE | GROSGRAN | SHANTENG | SILK | G3429 |

| DESIGNER | HANAKO ISHO | | INITIAL ENTRY 93/05/12 | 1ST EDITION 93/05/12 |
|---|---|---|---|---|
| SEX | FEMALE | AGE 27 | PRESENT 93/05/12 3:30PM | |
| DESIGNER'S WORDS (EXPRESSION OF FEELING) | | | LIST OF BASIC CLOTHES (AFTER LEARNING/MODIFIED) | |
| 1ST KEY | 2ND KEY | 1ST CANDIDATE | 2ND CANDIDATE | MATERIAL OF 1ST CANDIDATE. | PRODUCTION METHOD OF 1ST CANDIDATE |
| SOFT | WARM | FLANNEL | MELTON | WOOL | F5792 |

DATA INPUT SHEET FOR SEARCHING CLOTHES    DATE 1993/05/12

| TEXTILE CODE | | BRAND CODE | | APAREL ID | A001 |

CLOTH CODE | COLOR CODE | PATTERN CODE

IMPRESSION  [✓] SOFT    [ ] COOL
           [ ] HARD    [✓] WARM

SCROLL ICON ◁▷

FEATURE OF CLOTH | SOFT AND WARM CLOTH

MATERIAL CODE | WO | WOOL | 100%

SUITABLE SEASON | AUTUMN/WINTER

PARTNER | HANAKO ISHO

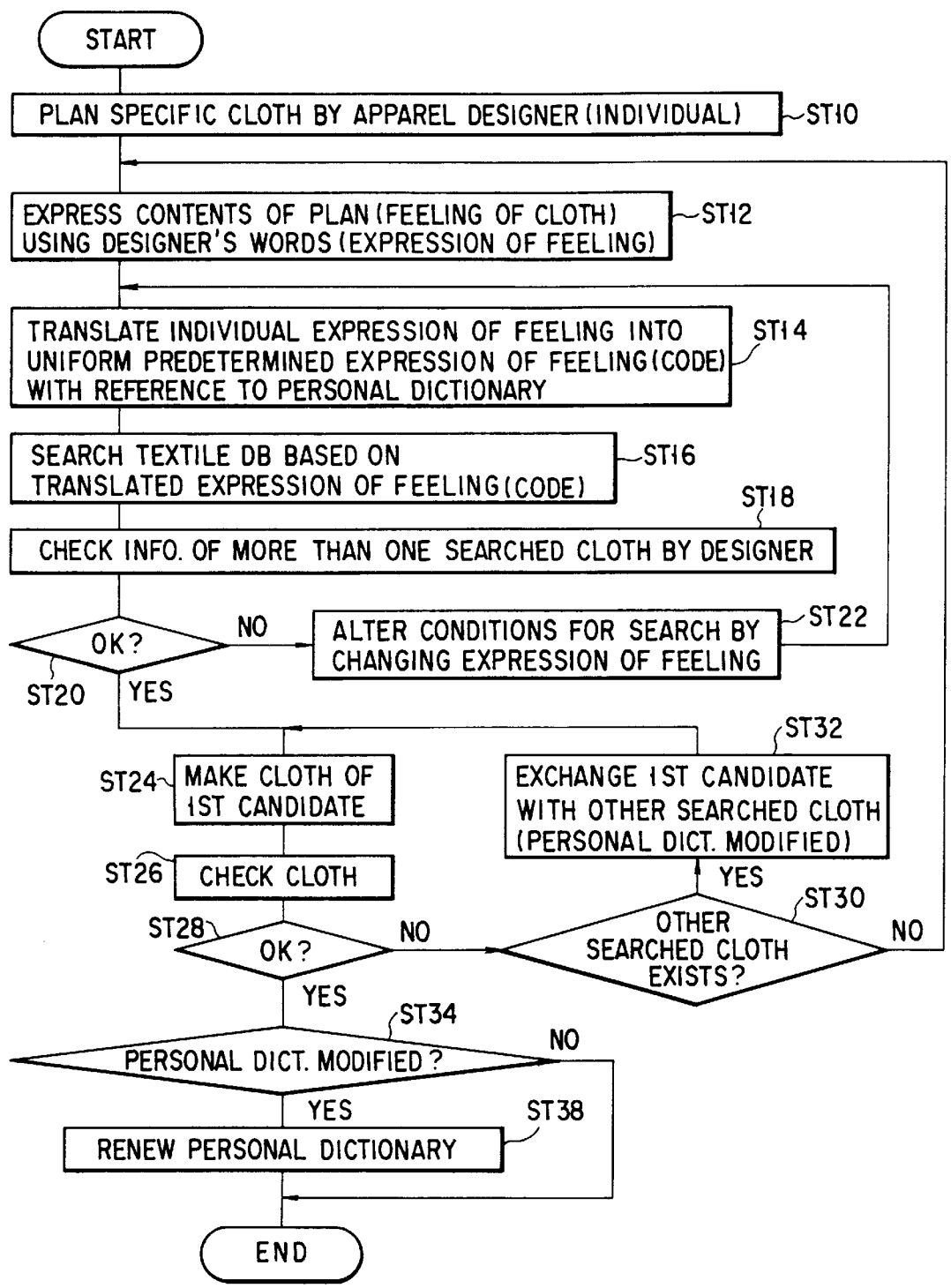
F I G. 16

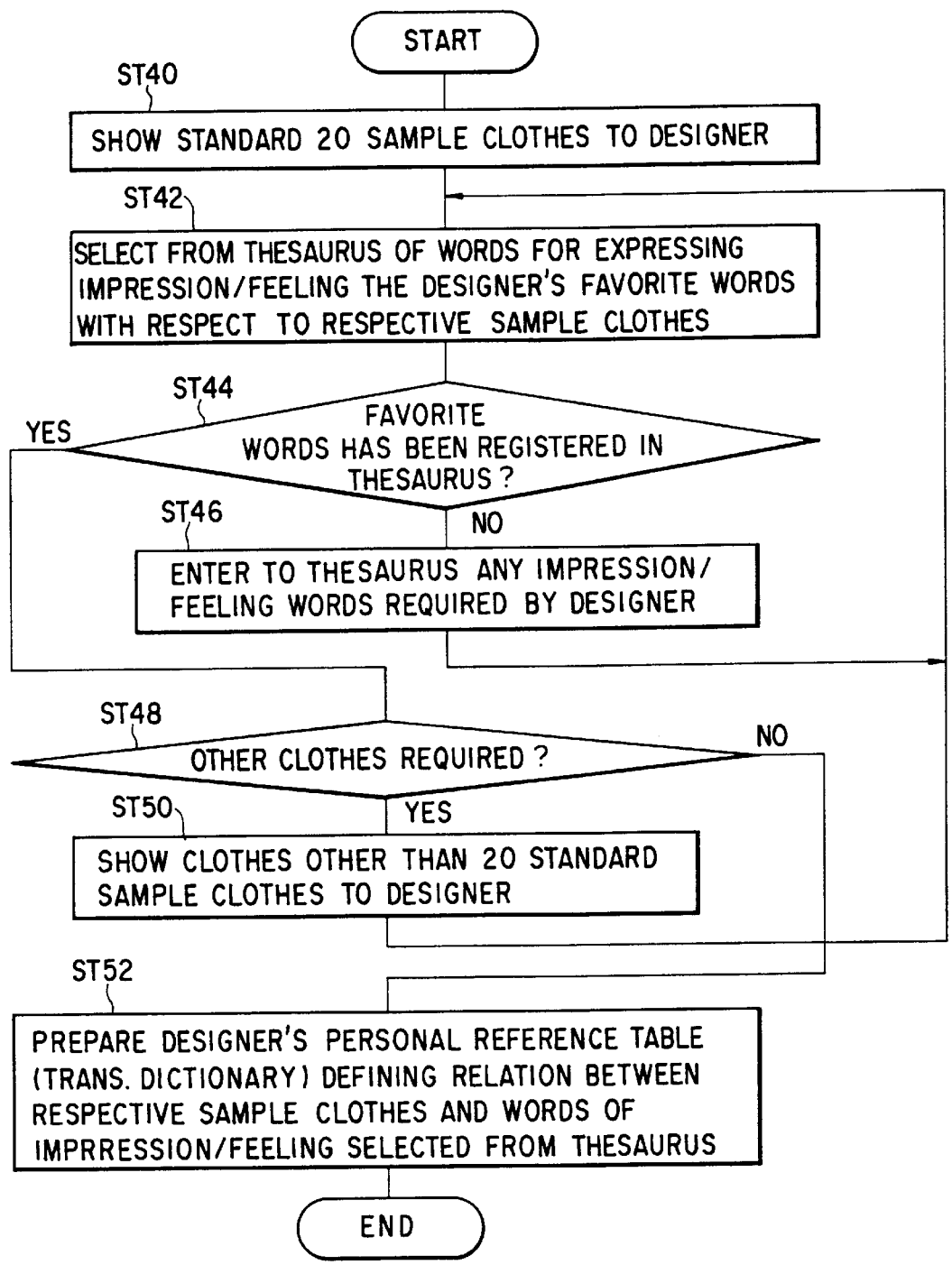
F I G. 17

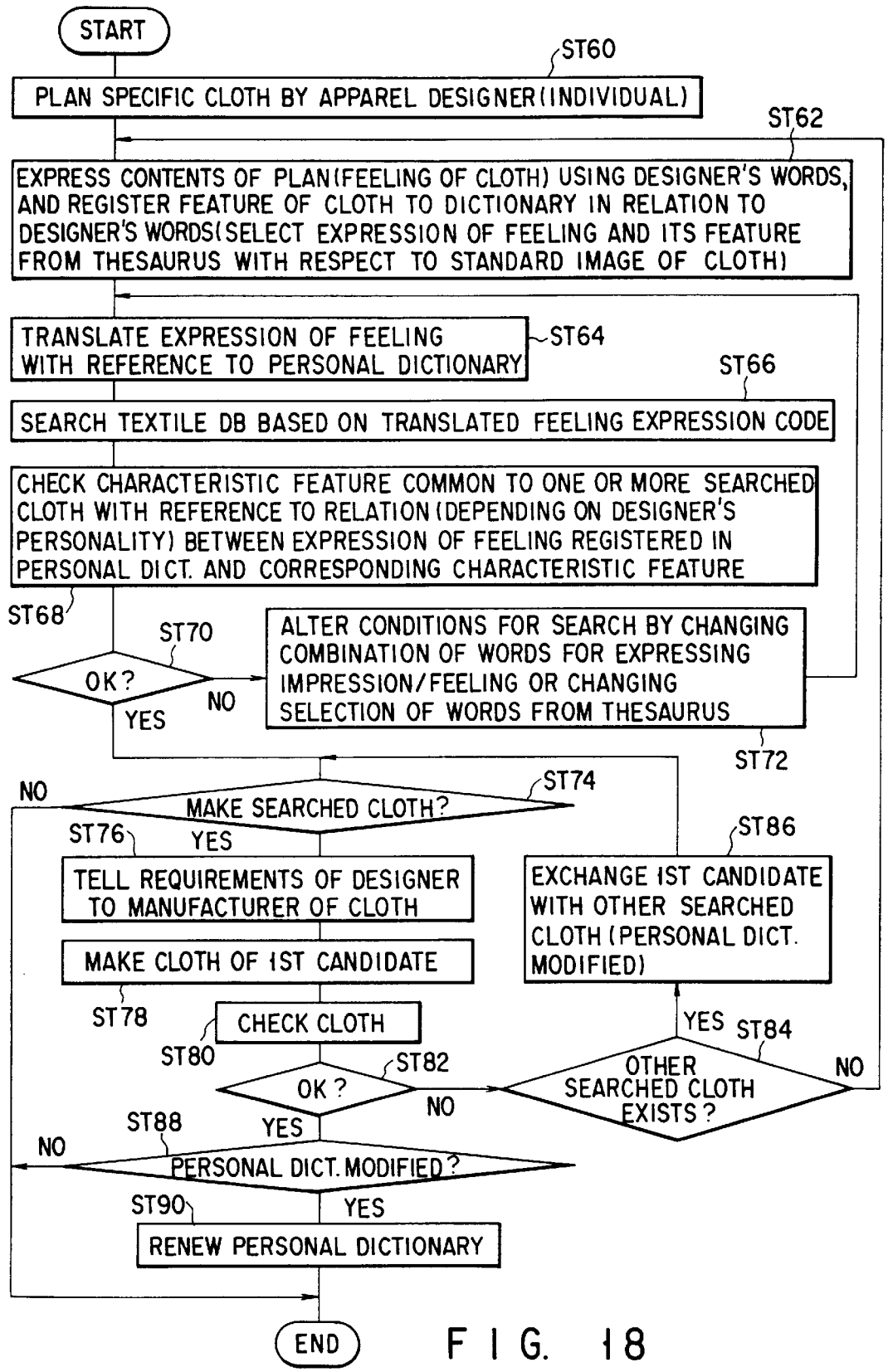
F I G. 18

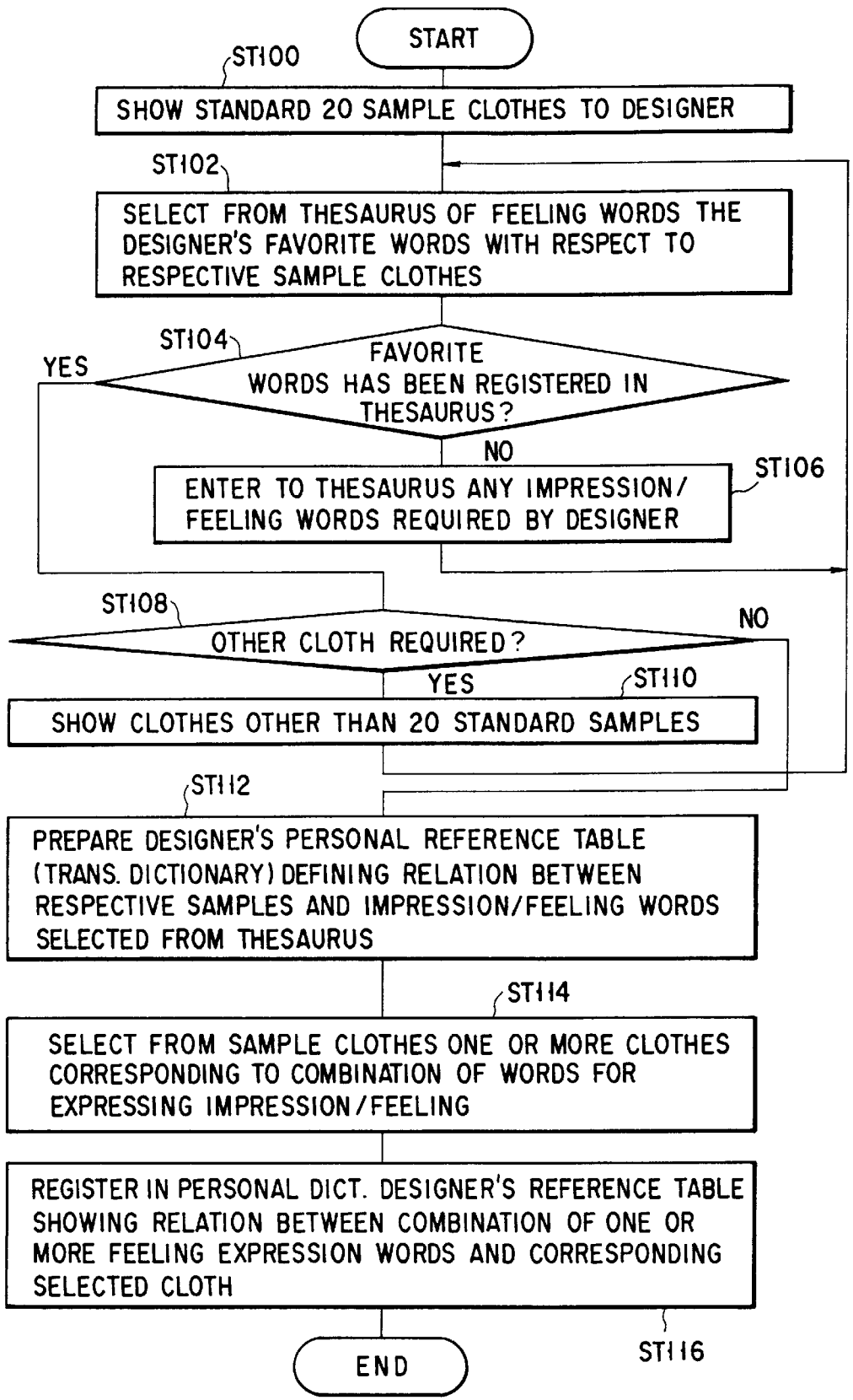
F I G. 19

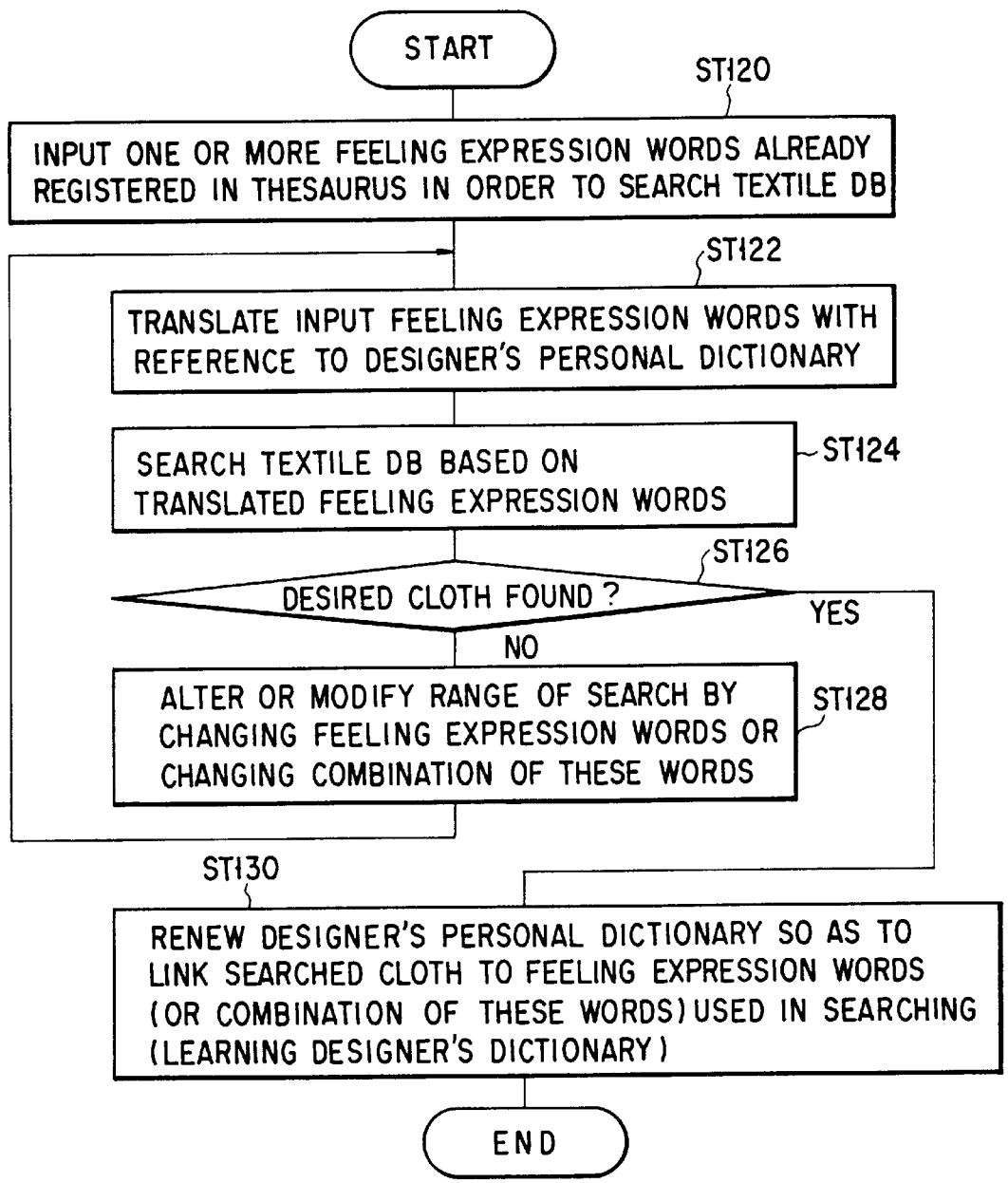
F I G. 20

6,026,243

SENSUOUS EXPRESSION TRANSLATION SYSTEM

This is a division of application Ser. No. 08/056,065 filed Apr. 30, 1993, now U.S. Pat. No. 5,459,602 issued Feb. 27, 1996.

BACKGROUND OF THE INVENTION

1. Field of the Invention

The present invention relates to an electronic information processing apparatus for electronically processing information associated with business operations required for cloth goods planning, a dress goods planning, and retail stock planning in the field of, e.g., apparel business and, more particularly, to processing of goods data having aesthetic or impressive attributes expressed by feeling expression words.

2. Description of the Related Art

The present invention also relates to a system for translating feeling expression words having different meanings (ambiguous meanings) based on different persons or aesthetic/intuitive sensuous expressions into information having a specific meaning. More particularly, the present invention relates to a sensuous expression translating system having a translation dictionary which can translate a given feeling expression word or sensuous expression and appropriately corrects the translation result in accordance with a given situation, thereby providing a learning/expansion function to the dictionary.

An apparel business world dealing with large-variation, small-quality cloths such as female quality dresses which tend to gain or lose the popularity is constituted by a large number of textile companies 102 which plan and manufacture textiles or cloths, a large number of apparel makers 104 which plan and manufacture dresses, and a large number of retail shops 108 which sell the dresses to general customers 106. Each textile company 102 delivers or sells cloths to a plurality of apparel makers 104, each apparel maker 104 delivers or sells the dresses to a plurality of retail shops 108, and each retail shop 108 sells the dresses to an indefinite number of customers 106, thus constituting a hierarchical structure.

Divisions where the goods are sold to the lower levels, i.e., the divisions where sales data are produced, are represented by hatched regions in FIG. 5.

Of the divisions where the sales data are produced, retail shop 108 performs electronic totaling or total processing and prepares a database on the basis of points of sales (POSs) of shops and on-line order and order reception data. The database is used for dress stock planning. In other levels, a business showing and the like of goods for lower levels are stored as a database in a sales division, and the resultant database is used in the planning division to plan goods.

FIG. 6 is a view showing an arrangement of an electronic information processing apparatus used in each company to support goods stock planning and goods planning described above. Referring to FIG. 6, reference numeral 110 denotes a data input device such as a bar code or card reader for reading a bar code tag attached to each goods and a register system; and 112, a designation/display device for data input operations.

Reference numeral 114 denotes an input processor for processing input data into a format necessary for forming a database, storing the processed data in auxiliary storage device 116 constituted by a local database (DB) and a memory, and sending a related description representing a specific goods purchased by a specific customer (company) at a specific time to central processing unit (CPU) 120 through on-line/off-line 118.

CPU 120 has master DB 120A including a sales DB for storing totaling information and the like, a customer DB for storing customer information, and a goods DB for storing goods information. CPU 120 determines the related description sent through the on-or off-line with reference to master DB 120A to perform totaling, thereby properly adding information to master DB 120A.

Reference numeral 122 denotes a designation/display device used for outputting totaling information and the like stored in master DB 120A.

Reference numeral 124 denotes an output processor for properly processing information supplied from master DB 120A under the control of CPU 120 when an output of totaling information or the like is designated at designation/display device 122. Output processor 124 then stores the processed information in auxiliary storage device 126 constituted by a local database (DB) and a memory, and outputs the processed data to CRT/printer 128.

In textile company 102 and apparel company 104, sales data of the goods of apparel company 104 or sales data of goods sold to retail shop 108 are totaled using this electronic information processing apparatus. A goods planner utilizes the totaling information for the next goods planning. Similarly, retail shop 108 totals the business showing of the dresses, and the resultant information is utilized for the next dress stock planning.

As described above, limited totaling has been conventionally performed on the basis of information within each company. That is, information of any other competitor or any other level is not available. Even if it is possible, a correspondence between the goods number and the actual goods is unknown, and information of the competitor or any other level cannot be analyzed. As only the business showing of the limited goods can be analyzed, a market trend cannot be predicted. Planned goods are not sold as expected, and an excessive stock is left, thus frequently resulting in undesirable returned goods and the excessive stock.

Companies of the respective levels may be connected through a computer network, and information open to the public may be exchanged between the companies in sufficient consideration of security.

The electronic information processing apparatuses of the respective companies are designed for the specific purposes of the corresponding companies. For this reason, the electronic information processing apparatus of a given company cannot be simply connected to those of other companies.

Each goods information has an aesthetic, sensuous, or impressive attribute such as a color and feeling or impression of a cloth. As such aesthetic attributes are classified based on different evaluation axes of the respective companies, the goods of the respective companies cannot be simply gathered and classified. For example, an attribute representing "green" in one company may be classified as an attribute representing "yellowish green" in another company. Therefore, some criterion is required for the aesthetic attributes for information exchange.

Meanwhile, if a given apparel designer wants to order a desired cloth suitable for his or her own design to a given cloth company (cloth manufacturer), an ambiguous sensuous expression (designer's words) is frequently used in a conversation (negotiation) between the designer and a salesman of the cloth company (or a cloth designer). Conventionally, when a designer orders a cloth, he or she does not present detailed physical data (or an exact cloth code), but orders the cloth using an ambiguous expression (designer's words) saying a "light, soft, warm, flossy cloth" or "silk-like, less-drapey, tensity, firm wool", although such an expression can be roughly understood.

The designer's words have large individual differences in meaning. A common language does not exit between the designer and the salesman (or between the designers). In other words, no common objective language does not exit between a cloth buyer and a cloth seller. In practice, smooth communication cannot be established between them.

Even if a designer explains the contents of a desired cloth to the cloth salesman (or the cloth designer), using the ambiguous designer's words associated with the feeling of the cloth (feeling expression words), the intention of the designer cannot be accurately understood by the salesman (or the cloth designer). A desired cloth cannot often be obtained unless samples are repeatedly produced or different types of samples are produced. Under these circumstances, a cloth having the feeling matching the intention of the designer cannot be easily produced. Negotiation time with the designer for re-manufacturing the cloth samples, and re-manufacturing expenses and time are wasted.

This phenomenon is not limited to the case in which an apparel designer orders a cloth. This also applies to all cases in which communication is established using ambiguous sensuous expressions (e.g., negotiations associated with taste, smell, sound, and the like).

SUMMARY OF THE INVENTION

The present invention has been made in consideration of the above situation, and has as its first object to provide an electronic information processing apparatus capable of performing input and output operations with reference to a unified classification or unified evaluation, increasing a degree of freedom of input and output operations, improving reliability of management information, and improving the security of information in a computer network system for supporting cloth and dress planning and managing the business showings of a plurality of companies having different levels as network subscribers.

It is the second object of the present invention to provide a sensuous or aesthetic expression translating system for objectively defining feeling expression words or sensuous expressions which cannot be easily expressed by numerical values and/or physical data.

In order to achieve the first object, an electronic information processing apparatus according to the present invention comprises a basic database, arranged to be accessible to each subscriber, for storing support information for supporting each subscriber to perform goods planning by electronic processing, a plurality of subscriber databases, uniquely prepared by the plurality of subscribers or prepared to correspond to the unified classification and evaluation axis of the basic database, for storing information of each goods having an aesthetic attribute unique to each subscriber, and database interface means, provided between the subscriber databases and the basic database, for converting the aesthetic attribute to data corresponding to the unified classification and evaluation axis and for causing the basic database to fetch data stored in each subscriber database as part of the support information.

In the electronic information processing apparatus according to the present invention, when a large number of subscribers such as a plurality of textile companies for planning and manufacturing cloths, a plurality of apparel makers for planning and manufacturing dresses, and a plurality of retail shops for selling the dresses are to register information of the subscriber databases uniquely prepared by the subscribers in the basic database accessible to each subscriber, an aesthetic attribute uniquely assigned by each subscriber is converted to data corresponding to the unified classification and evaluation axis of the basic database, and the converted data is stored in the basic database.

In order to achieve the second object, the sensuous expression translating system comprises: translating means for translating a feeling expression word or sensuous expression having different meanings depending on different environments (different users or different periods even if the same user uses this word or expression) into information (e.g., cloth information) having a specific meaning; storage means for storing translation information (e.g., translation dictionary table) defining a correspondence between the feeling expression word or sensuous expression and an object (e.g., cloth) represented by information translated by the translating means; and correcting means for correcting (or learning) a translation error occurring in the translation information, which error is caused by a difference obtained when an object represented by the feeling expression word or sensuous expression is different from that represented by the information translated by the translating means.

The translating mean translates the feeling expression word or sensuous expression into the information (cloth information) having the specific meaning on the basis of the translation information corrected by the correcting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A to 3C are detailed flow charts showing a subroutine of an input of search conditions, a subroutine of format conversion for basic DB, and a subroutine of generation of data of shortage in FIG. 2B, respectively;

FIG. 6 is a view showing an arrangement of a general electronic information processing apparatus;

FIG. 7 is a block diagram showing an arrangement to which a sensuous/aesthetic expression translating system according to an embodiment of the invention is applied;

FIG. 8 is a view showing an input template for registering or entering information associated with a cloth (textile goods) using a feeling expression word;

FIG. 10 is a view showing a dictionary for storing feeling expression words (designer's words) registered by individual subscribers, feeling expression codes corresponding to the feeling expression words, and cloth names corresponding thereto;

FIG. 11 is a view showing a translation dictionary for storing feeling expression words registered by individual subscribers, cloth names corresponding thereto, and production methods thereof;

FIG. 12 shows an example of cloth production data listed up in the translation dictionary shown in FIG. 10 or 11;

FIG. 13 is a view for explaining how the contents of the feeling expression word used by a designer (user) are parsed/analyzed;

FIG. 14 is a view showing another translation dictionary for storing feeling expression words, cloth names corresponding thereto, and production methods thereof;

FIG. 15 is a view showing a data input template used when a cloth is searched using designer's words;

FIG. 16 is a flow chart for explaining a sequence for searching and producing a cloth, using feeling expression words with reference to the translation dictionary;

FIG. 17 is a flow chart for explaining a sequence for preparing a translation dictionary;

FIG. 18 is a flow chart for explaining another sequence for searching and producing a desired cloth, using feeling expression words with reference to a translation dictionary;

FIG. 19 is a flow chart showing another sequence for preparing a translation dictionary;

FIG. 20 is a flow chart for explaining a learning sequence of a translation dictionary;

DETAILED DESCRIPTION OF THE PREFERRED EMBODIMENTS

An embodiment of the first object of the present invention will be described with reference to the accompanying drawings.

Figure 2A:
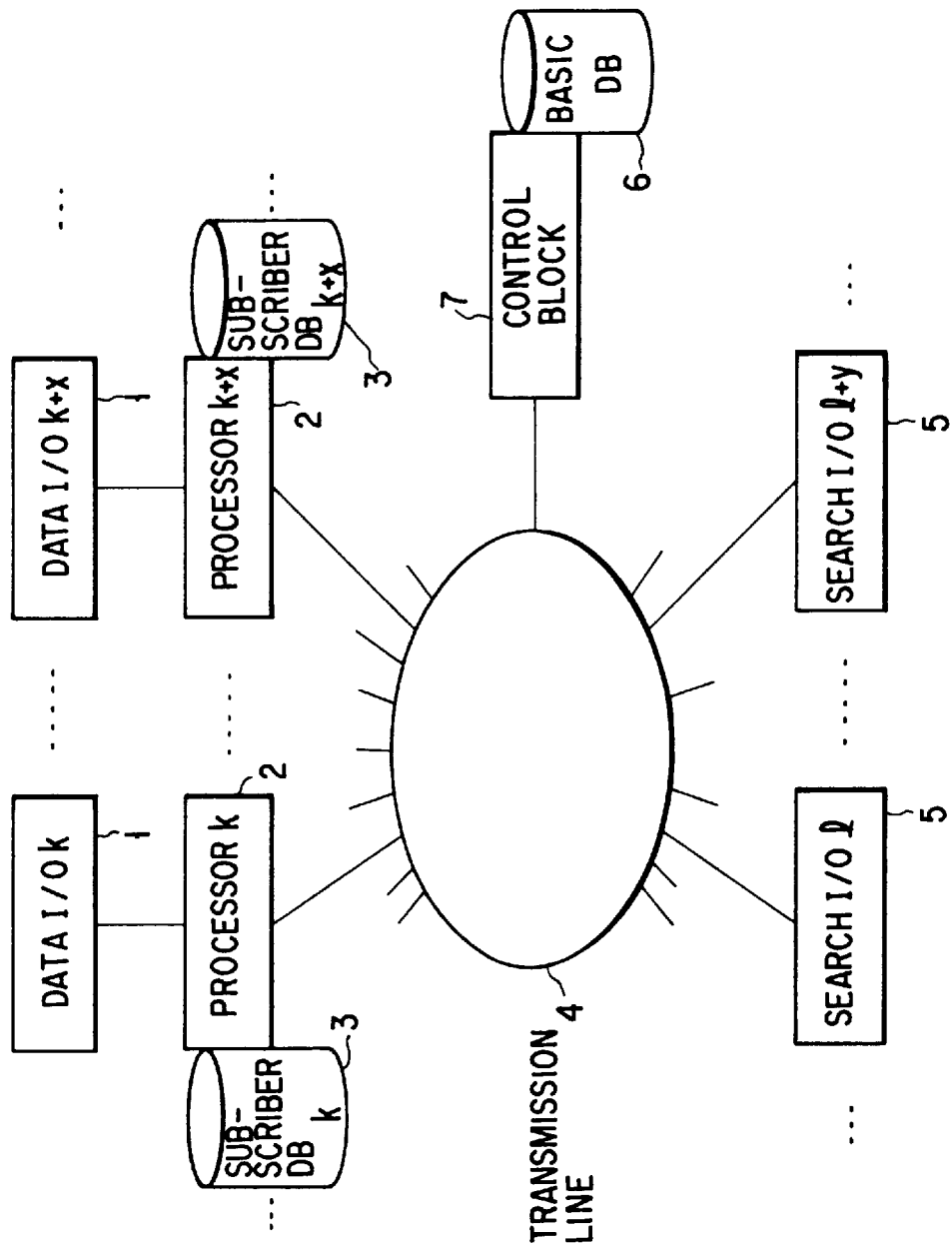
FIG. 2A is a diagram showing an arrangement of a computer network to which the electronic information processing apparatus of the embodiment of FIG. 1 is applied.

FIG. 2A is a view showing an arrangement of a computer network applied to an electronic information processing apparatus for supporting goods planning and goods stock planning, using a database integrated by a computer network, so as to electronically process information associated with business operations necessary for cloth goods planning, dress goods planning, and retail goods stock planning in the apparel business world according to an embodiment of the present invention.

In FIG. 2A, reference numeral 1 denotes a plurality of data I/Os installed at subscribers such as textile companies, apparel makers, and retail shops. Each data I/O 1 includes input devices such as a bar code reader or card reader, a register system, and a keyboard, and output devices such as a CRT display and a printer.

Reference numerals 2 denote processors for processing the data input from data I/Os 1, converting the input data to information having a format designed in accordance with the business operation contents of the respective companies, and storing the converted information in subscriber databases (DBs) 3 of their own. Each processor 2 reads out various data such as business showing information stored in corresponding subscriber DB 3 and outputs it to corresponding data I/O 1 in accordance with a data call request from this data I/O 1.

Reference numeral 4 denotes a transmission line constituted by a leased or public telephone line to which processors 2 are connected, or by an on-line medium. Transmission line 4 is connected to a large number of search I/Os 5 arranged in the respective subscribers such as textile companies, apparel makers, and retail shops and to control block 7 coupled with basic DB 6. Basic DB 6 may be logically connected within the network. In this case, basic DB 6 serves as a distributed data base.

Each search I/O 5 is constituted by a search input device including a CRT display and a keyboard and/or a mouse for inputting search conditions and sending them to transmission line 4, and a search output device including a CRT display and a printer to receive and output a result of search. Search I/Os 5 may be constituted by a common search I/O connected to data I/Os 1 and processors 2.

Control block 7 periodically or non-periodically receives and integrates information from each subscriber DB 3 through corresponding processor 2 and transmission line 4. Control block 7 converts (or encodes) this information so that the source of this information cannot be specified, and stores the converted information in basic DB 6. Control block 7 searches data from basic DB 6 in response to a search request from each search I/O 5 through transmission line 4 and answers a search result to source search I/O 5 through transmission line 4.

Information stored in each subscriber DB 3 is information having a format unique to each subscriber. In addition, this information has an aesthetic/sensuous attribute of the subscriber. Such attributes have different classification evaluation axes depending on different subscribers in such a manner that "green" perceived by a given subscriber may be perceived as "yellowish green" by another subscriber. When information from each subscriber DB 3 is directly fetched to basic DB 6, information has poor precision. Similarly, when search conditions are given from search I/O 5, the range of "green" input as the search condition may not be the range of "green" in basic DB 6. Basic DB 6 cannot be directly searched in accordance with the conditions associated with aesthetic attributes.

When information from each subscriber DB 3 is received periodically or as needed, and a search request is input from search I/O 5, control block 7 converts (translates) an aesthetic/sensuous attribute and a subscriber code unique to each subscriber into data corresponding to the unified classification or evaluation axis of basic DB 6. Control block 7 then stores or searches information.

Figure 1:
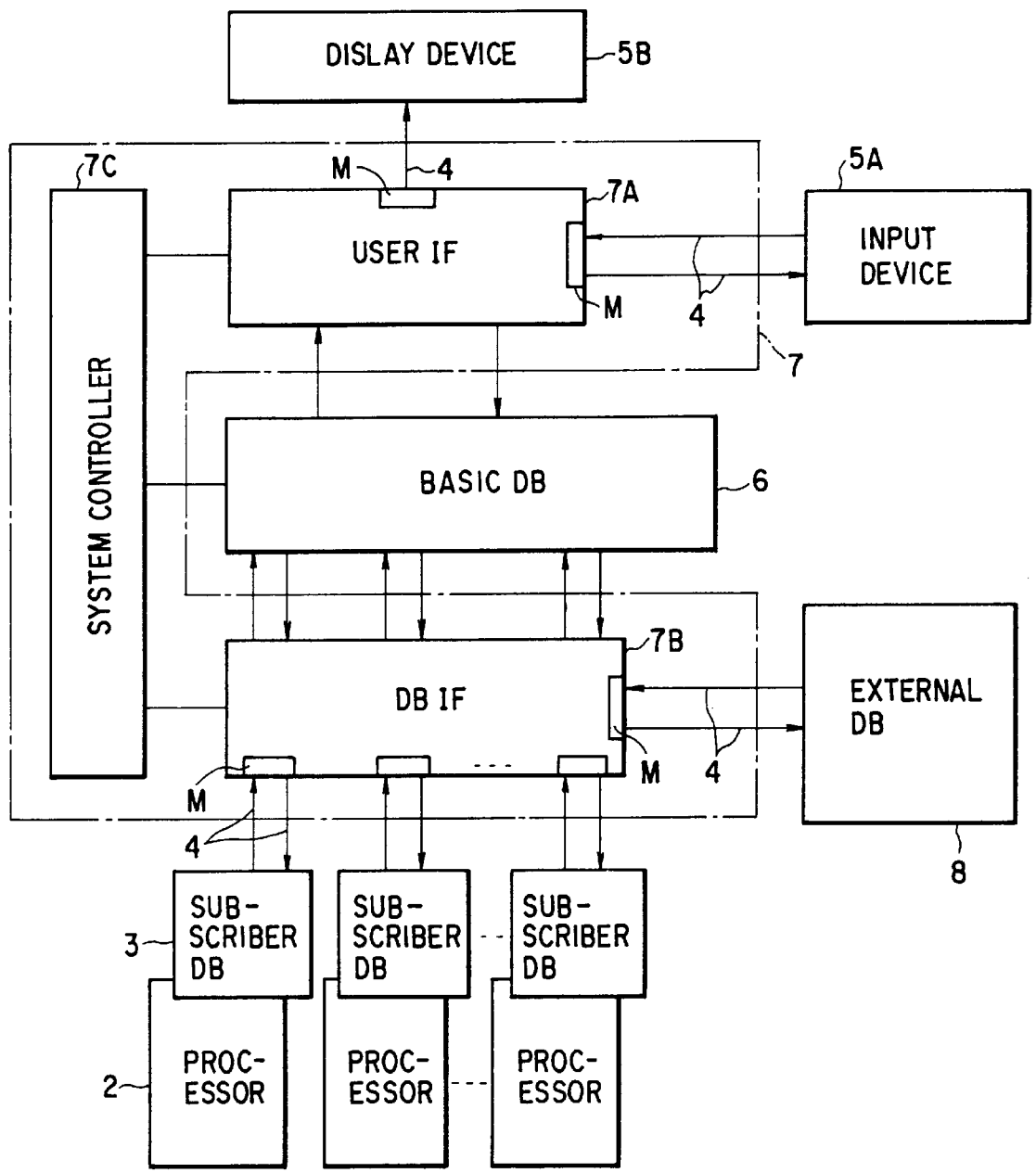
FIG. 1 is a block diagram of an electronic information processing apparatus according to an embodiment of the present invention.

FIG. 1 is a view showing the arrangement of the electronic information processing apparatus according to an embodiment of the present invention. The same reference numerals as in FIG. 2A denote the same parts in FIG. 1.

Search I/O 5 is constituted by input device 5A for inputting search conditions and display device 5B for outputting a search result.

Control block 7 is constituted by user IF 7A serving as an interface between basic DB 6 and input and display devices 5A and 5B, DBIF 7B serving as an interface between subscriber DB 3 and basic DB 6, and system controller 7C for controlling basic DB 6, user IF 7A, and DBIF 7B.

These arrangements logically function in the network. User IF 7A may be arranged on the side of input device 5 or DBIF 7B may be arranged on the side of subscriber DB 3.

Reference numeral 8 denotes an external DB such as an image DB for storing European trend information and a credit card verification DB. Reference symbols M denote transmission adapters corresponding to on- and off-lines.

An operation of the above arrangement will be described below.

Figure 2B:
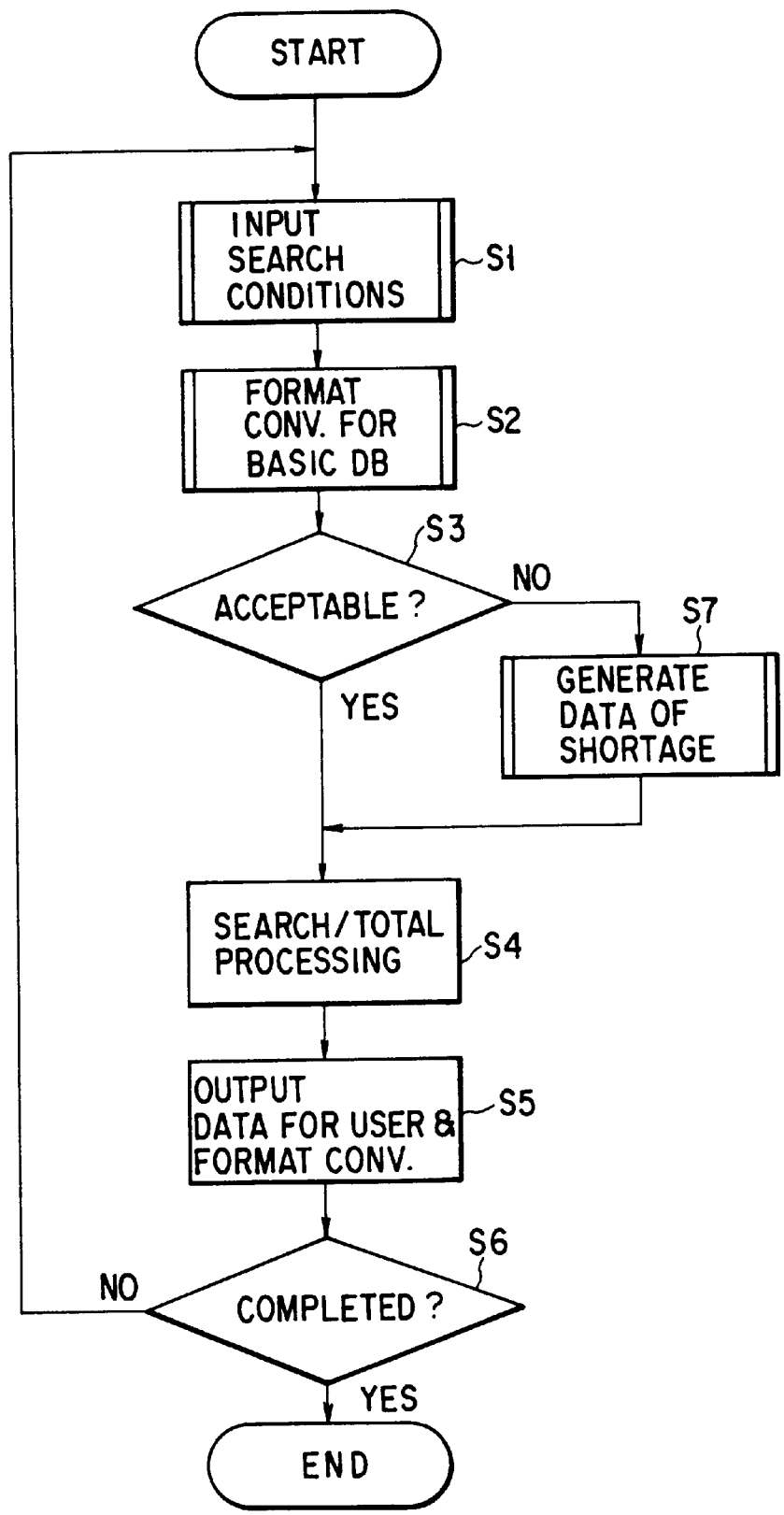
FIG. 2B is a flow chart for explaining a search operation in the embodiment of FIG. 1.

FIG. 2B is a flow chart of a search operation for searching a sales trend of dresses having the same type as that of dresses to be planned by an apparel maker so as to predict a prospective sales volume.

A planner inputs search conditions from input device 5A (step S1 in FIG. 2B). This search condition input operations include an operation for inputting a plurality of search conditions, as shown in FIG. 3A. The range of objective makers such as a "female apparel maker" or "competitive makers" is input (step S11 in FIG. 3A), and an objective item such as "skirts" or "suits" is input (step S12). In addition, color information such as "green" or "beige" (step S13) and information of positioning such as "cool and casual" or "elegant" (step S14), and age data such as a "good seller for the age range of 25 to 35" (step S15) are input.

When these search conditions are input, user IF 7A looks up an attribute table (not shown) to convert each search condition to data having a format of basic DB 6 (step S2 in FIG. 2B).

This conversion, i.e., processing for canceling each search condition is performed, as shown in FIG. 3B.

First of all, a user is specified by an input device ID, and a specific maker is selected from basic DB 6 using the maker attribute table of this user (step S21 in FIG. 3B). For example, if "competitive makers" are specified, a company group having the same contents of business operations as those of the user is selected from basic DB 6.

User's items are converted to standard items of basic DB 6 (step S22). For example, if skirts specified by the user represent both mini and long skirts, the search conditions as "skirts" are converted to "mini skirts" and "long skirts".

A user color table is looked up to specify the range of colors (color evaluation axis) of basic DB 6 (step S23). For example, the range of color evaluation axis represented by "green" of the user is specified.

A user positioning table is looked up to replace user's positioning words with standard words of basic DB 6 (step S24). More specifically, the dress are classified in accordance with life stages (e.g., junior and young), life styles (e.g., conservative and enjoyable), occasions (e.g., formal and city), goods images (e.g., elegant and sporty), goods grades (e.g., prestige and better zone), goods minds (e.g., young mind and missy mind), goods tastes (e.g., vanguard and contemporary), seasons (e.g., spring and summer), and color images (e.g., pretty, cool, and casual). The positioning words of "cool and causal" specified by the user are replaced with the standard positioning words of basic DB 6.

A user's age classification table is looked up to specify the search condition as to age of basic DB 6 (step S25). For example, the search condition of the "age range of 25 to 35" is determined whether data normalizing this range is requested or raw data of each age is requested, thereby classifying the range.

When the input search conditions are converted to search conditions for searching basic DB 6, it is checked if necessary search/total processing can be performed using only information periodically received from each subscriber DB 3 (step S3 in FIG. 2B). If possible, search/total processing is performed (step S4).

The result is converted to a user output format by user IF 7A and is sent to display device 5B to display or print the result (step S5). This conversion is performed to convert the format to an appropriate format with reference to an output attribute table (not shown) in accordance with user's preference, i.e., a table or graph.

When a search operation is performed under still another condition (step S6), the operations are repeated from step S1.

On the other hand, if it is determined in step S3 (FIG. 2B) that only the data of basic DB 6 is not sufficient, i.e., if information non-periodically received from each subscriber DB 3 must be used, data of shortage is generated from each subscriber DB 3 (step S7), and search/total processing is performed in step S4.

Processing of generating data of shortage is performed as shown in FIG. 3C.

After destination subscriber DB 3 of inquiry and external DB 8 are designated (step S71 in FIG. 3C), specific items in this subscriber DB 3 and external DB 8 are specified using DBIF 7B (step S72). To designate the specific items is to convert the search conditions corresponding to the unified classification or evaluation axis of basic DB 6 to the classifications or evaluation axes of destination subscriber DB 3 of inquiry and external DB 8.

An inquiry is sent to destination subscriber DB 3 and external DB 8 under the designated converted search conditions (step S73). Search output answers from subscriber DB 3 and external DB 8 are fetched to basic DB 6 in accordance with the unified classification or evaluation axis of basic DB 6 (step S74).

As described above, if basic DB 6 has a shortage of data, additional data are obtained from each subscriber DB 3 and external DB 8. A planner can predict the sales volume of the planned goods on the basis of information such as a business showing displayed or printed at display device 5B. Therefore, the planner can decide whether this planned goods is actually manufactured. If so, the planner can decide the manufacturing amount of the goods.

An operation of converting an aesthetic/sensuous attribute to the unified classification or evaluation axis of basic DB 6 and an operation of generating data of shortage from subscriber DB 3 and external EB 8 will be described with reference to a flow chart in FIG. 4A when a search condition is, e.g., "green".

Figures 4A, 4B:
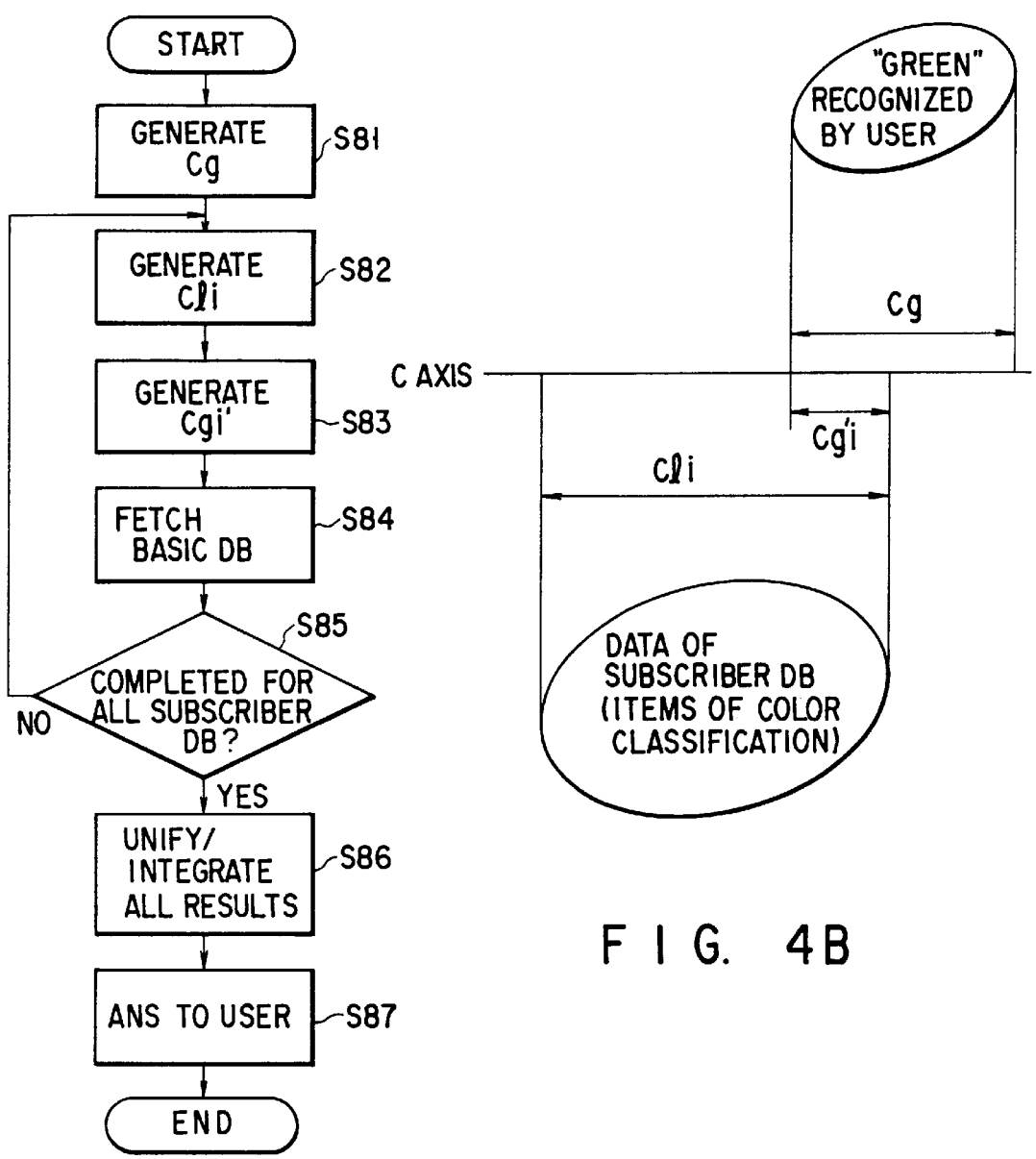
FIG. 4A is a flow chart for explaining an operation of actually converting an aesthetic attribute to data based on the unified classification or evaluation axis of the basic DB and an operation of generating data of shortage from a subscriber DB and an external DB.
FIG. 4B is a view showing the color range of "green" recognized by a user and the color range of "green" in the subscriber DB.
Figure 5:
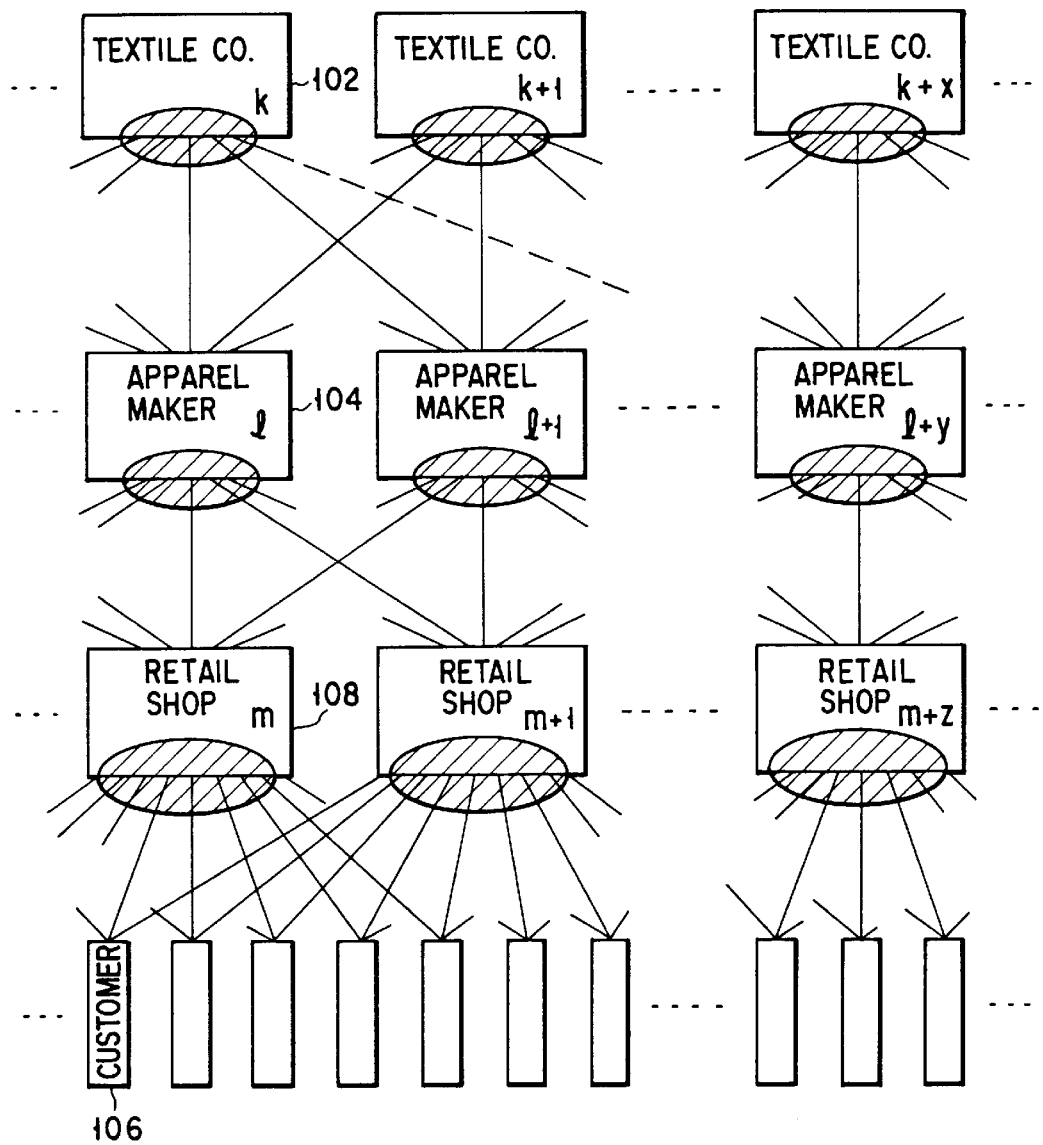
FIG. 5 is a view showing a hierarchical structure of apparel business.

As shown in FIG. 4B, assume that "green" perceived by a Japanese user is different from "green" in sales analysis DB in subscriber DB 3 of a French boutique. Various methods are available to express a color classification axis of basic DB 6. For the sake of simplicity, one-dimensional color coordinate axis (C axis) is used to describe the color classification axis.

An area $C_g$ on the C axis which corresponds to "green" perceived by the user is generated in step S81 (this corresponds to step S13 in FIG. 3A and step S23 in FIG. 3B).

In step S81, an objective area $C_{li}$ of all items of color classification of ith subscriber DB 3 (including external DB 8) as an object on the C axis is generated (this corresponds to steps S71 and S72 in FIG. 3C).

In step S83, the areas $C_g$ and $C_{li}$ and a common area $C_{g,i}$ on the C axis are specified (this corresponds to step S72). In step S84, a necessary operation of "information of corresponding subscriber DB 3" corresponding to $C_{g'i}$ is performed, and the results are fetched by basic DB 6 (this corresponds to steps S73 and S74).

It is determined whether this operation is completed for i subscriber DBs 3. If no, the operation is repeated for all i subscriber DBs 3.

When operations for all designated subscriber DBs 3 are completed, the results fetched from each subscriber DB 3 to basic DB 6 are normalized on the C axis and are unified/integrated (this corresponds to step S4) in step S86. In step S87, the unified/integrated results are answered to the user (this corresponds to step S5).

To perform the above operations, privacy of each subscriber DB 3 and construction know-how thereof, and privacy of a user for accessing basic DB 6 and search know-how thereof must be confidential.

DBIF 7B cannot be accessed except for a system manager using a password or the like. More specifically, $C_{li}$ and $C_{g'i}$ are encrypted not to be known to a third party except for the information supplier. User IF 5B is arranged not to be accessed except for the corresponding user. That is, $C_g$ is encrypted not to be known to a third party except for the corresponding user.

To inhibit to specify a subscriber as a target object, information except for the integrated information of a plurality of subscribers cannot be accessed.

As described above in detail, according to the present invention, there is provided an electronic information processing apparatus capable of performing input and output system processing with reference to the unified classification and evaluation axis, improving a degree of freedom of input and output operations, improving management information, and improving information security in a computer network system for supporting cloth and dress planning and managing a business showing of a plurality of companies as a plurality of levels in the network system.

An embodiment of the second object of the present invention will be described with reference to the accompanying drawings. Assume that a sensuous/aesthetic expression translating system according to the present invention is used in an information service system for an apparel business world.

FIG. 7 shows a schematic arrangement of the information service system to which a sensuous expression translating system according to an embodiment is applied. This information service system is operated by a value-added system company (to be referred to as a VAS hereinafter). Apparel makers, retail shops, cloth companies, and the like constituting the apparel business world are subscribers of the VAS.

The VAS has large integration database 100. This integration database 100 includes a trading database (trading DB) for storing trading condition information between the subscribers in real time, an apparel database (apparel DB) for storing various kinds of information of new and old goods manufactured by apparel makers, a manufacturing information database (manufacturing info. DB) for storing information associated with the manufacture from the order of goods material to sewing, a planning information database (planning DB) for storing information associated with planning of new goods to be sold, a managing support database (managing support DB) for storing information associated with managing support of each subscriber, and a textile database (textile DB) for storing information associated with fabric (cloth/textile) used as a goods cloth. The contents of these databases included in integration database 100 are the common source to all the subscribers of the VAS.

Terminals 20 of a plurality of apparel makers as the VAS subscribers can be connected to integration database 100 of the VAS through transmission lines 1. Each terminal 20 has system controller 7C for controlling the overall operation of the terminal. System controller 7C has a conventional small computer and includes a CPU and a memory.

Each terminal 20 comprises input device 5A using a keyboard and a mouse, a display 5B using a CRT display or liquid crystal display (LCD), user interface 7A for connecting input device 5A and display 5B to system controller 7C, storage (memory) 2 for storing a basic dictionary/user dictionary looked up in translation of a sensuous expression, storage (memory) 3 for storing a database for production methods of various cloths selected in correspondence with sensuous expressions, local database (textile DB) 6 for storing data of various kinds of cloths selected in correspondence with sensuous expressions, and communication interface 4 for interfacing communication between system controller 7C and VAS 100.

Interface 4 is assigned with an apparel ID for specifying an apparel maker in which terminal 20 is installed. In communication between terminal 20 and VAS 100, the apparel ID is automatically added to communication data.

Storage 2 is a memory including a basic dictionary having contents which are preset as defaults by the sensuous expression translating system, and a user dictionary individually or uniquely prepared by a user (e.g., an apparel designer or a salesman of a cloth company) during the operation of the system.

This memory (2) comprises a ROM for non-rewritable information (e.g., basic dictionary information set as defaults) and a RAM or EEPROM (electrically erasable programmable ROM) for rewritable information (e.g., part of the basic dictionary and user dictionary information). These dictionaries include a list of various kinds of cloths, various feeling expression words (a combination of at least one feeling expression word), and table data representing a correspondence between the cloth list and the feeling expression words. Storage 3 as the database for production methods includes a list of various kinds of cloths and detailed data necessary for manufacturing cloths.

Storage 2 as the basic dictionary/user dictionary may be arranged in an IC card, in a hard disk, or in an optical disk (CD ROM or MO disk) together with databases 3 and 6.

FIG. 8 shows an entry template for registering information associated with a cloth (textile goods) in the VAS, using a feeling or impression expression word. This template is displayed on display 5B when information associated with the cloth goods is registered in integration database 100 of the VAS. This template is used to inform specific time (registration date), a specific place (cloth company or apparel maker ID), a specific person (name of person in charge or name of designer), a specific object (e.g., a cloth code and/or a brand code), and a specific expression (e.g., selection of candidates of verbal feature expressions and verbal feeling expressions of the cloth) to the VAS computer system.

FIG. 8 shows a case in which an apparel designer touches and evaluates a denim cloth presented by a salesman of a cloth business company as a "cloth for a adult suite which is light, soft, and somewhat slimy".

To inform the cloth evaluated with feeling expression words by a designer to system controller 7C of terminal 20, an impression selection menu of the feeling expression words as defaults set by a cloth company or the like so as to appropriately express this cloth (denim) is output at the center of the template in FIG. 8. In this case, pairs of upper and lower feeling expression words having opposite meanings are displayed. The feeling expression words set as defaults are stored in the basic dictionary of storage 2.

For example, if this designer touches the cloth (denim) to feel "thin", he or she inputs a check mark in the column at the beginning of the word "thin" of the leftmost feeling expression word (alternatively, number of "1" may be written instead of writing the check mark). If the designer feels the cloth as "soft", he or she inputs a check mark in the column at the beginning of the word "soft". If the designer feels the cloth as "wet", he or she inputs a check mark in the column at the beginning of the word "wet". If the designer feels the cloth as "rough", he or she inputs a check mark in the column at the beginning of the word "rough".

In this cloth goods information entry template, an arrow key in the keyboard is depressed or a triangular scroll icon is clicked with the mouse pointer to change the selection candidates of the displayed contents. After desired selection candidates are set, the displayed feeling expression words are selected with check marks in the same manner as described above.

When entry operations on the template are completed, the cloth (denim touched by the designer) physically and objectively specified by a cloth code or the like can be caused to correspond to the aesthetic/sensuous expression (i.e., a sentence of the feature of the cloth) felt by the designer in correspondence with this cloth. This correspondence is registered in the form of, e.g., a table in the user dictionary in storage 2.

More specifically, a combination (logical AND) of the feeling expression words ("light", "soft", "somewhat slimy", "adult", and "cloth for suit") is caused to correspond to a combination of character codes of feeling expression words ("thin", "soft", "wet", and "rough") in a one-to-one correspondence. The combination of the feeling expression codes is caused to correspond to the cloth code of the cloth (denim) expressed by the feeling expression words in a one-to-one correspondence and is registered in the user dictionary of storage 2. Note that data of the cloth (denim) itself is registered in both local database 6 and VAS integration database 100 (or at least one of them).

After the registration using the template shown in FIG. 8 is completed, assume that the same designer expresses a cloth using designer's words or equivalent words (for example, the word "fluffy" is equivalent to "soft" and the word "grownup" is equivalent to "adult") as "light", "soft", "somewhat slimy", "adult", and "cloth for suit" (these expressions have different meanings depending on different designers). This combination of the feeling expression words is translated into a combination of character codes (these codes themselves do not vary depending on individual differences) of "thin", "soft", "wet", and "rough".

One or more character codes obtained by translating the designer's words are used as keywords for searching local database 6 or VAS integration database 100. (That is, when data is output from communication interface 4 in FIG. 7, designer's words are represented by a combination of character codes being free from individual differences.) The cloth (denim) intended by the designer can be accurately specified in accordance with the combination of translated character codes without performing a search operation.

When a cloth company newly registers its own new cloth goods, using the template shown in FIG. 8, the input of the features (sentence) of the cloth and selection of feeling expression words are not performed by an apparel designer but by staff (e.g., a salesman or cloth designer) of the cloth company. In this case, the apparel ID in FIG. 8 is a cloth company ID.

Figure 9:
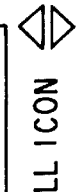
FIG. 9 is a view showing another input template for registering or entering information associated with a cloth using a feeling expression word.

FIG. 9 shows a cloth goods information entry template for registering a correspondence between a given cloth and feeling expression words. This template is assumed to prepare a translation dictionary of feeling expression words in a top-down manner.

Assume that a salesman in a given cloth company presents a cloth sample as "wool poplin" having a cloth code of 040200000030, a brand code of 20000, a color code of 30, a pattern code of 2987, and a cloth code of 025 to a designer (Hanako Isho) of an apparel maker of ID=A001. The salesman explains that the material of this cloth is 100% wool and the cloth is suitable for autumn and winter. A method of producing the cloth called "wool poplin" specified by the above codes is also predetermined. The production method is stored in database 3 of production methods and/or the manufacturing information DB of VAS integration database 100.

The designer (Hanako Isho) who touches the sample of "wool poplin" mentions her impression such that "this sample has moderate drape and is tensity and firm, and the sample feels like silk". The salesman inputs "silk-like wool which has moderate drape and is tensity and firm" as the feature of the cloth in the template (FIG. 9) displayed on apparel terminal 20 (FIG. 7) or on an electric note or a note-type personal computer having the same functions as those of this terminal. The salesman asks questions to the designer and selects feeling expression words associated with the cloth from the feeling expression or impression selection menu. (The input of features of the cloth and impression selection menu selection may be performed by the designer herself.)

The above question/selection operation provides a table as shown in FIG. 10 which represents the correspondence among the basic cloth name (wool poplin) as an object, the designer's words (silk-like wool which has moderate drape and is tensity and firm) expressing the feature of the cloth, the corresponding feeling expression words (moderate drape; firm; silk-like; and wool fabric), and their codes (xxxxxx). (Note that the production method and other display contents are omitted for illustrative convenience in FIG. 10.) This table serves as part of the translation dictionary for only Hanako Isho. That is, when this translation dictionary is looked up, and Hanako Isho specifies the "silk-like wool which has moderate drape and is tensity and firm", this is translated into codes representing a silk-like wool fabric which has moderate drape and is tensity and firm. When the textile database is searched on the basis of these codes, wool poplin is found.

The operations of inputting and selecting the feeling expression words for the specific cloth (wool poplin) is performed for other cloths (e.g., flannel). As shown in FIG. 11, a translation dictionary table representing the correspondence among designer's words registered for each individual (Hanako Isho), the name of corresponding cloths, and production methods is obtained for various kinds of basic cloths.

The table shown in FIG. 11 functions as a translation dictionary for only Hanako Isho as the staff in the apparel maker of ID=A001. The contents (correspondence between the name of basic cloth and the designer's words) of the translation dictionaries vary depending on different designers even for the same objective cloths. The contents of the dictionaries may vary even if the same designer registers (or enters) the designer's words at different times. In addition, different kinds of cloths may be registered from the same designer's words.

As shown in FIG. 11, for example, the cloth corresponding to the designer's words saying "silk-like wool which has moderate drape or is less drapey and is tensity and firm" is only "wool poplin" at the first registration time of Mar. 11, 1992. However, in the fifth registration (5th edition) of Oct. 1, 1992, it is possible for the same designer to add a cloth as "tropical" by the designer's words saying "silk-like wool which is less drapey and is tensity and firm".

In this case, after Oct. 1, 1992, when the textile DB is searched based on the designer's words as "silk-like, less-drapey, tensity, and firm", "wool poplin" and "tropical" are found, but no problem is posed due to the following reason. Whether the material desired by the designer (Hanako Isho) is "wool poplin" or "tropical" can be determined by the designer when the designer checks the samples (images and other data displayed at terminal 20 or, if necessary, cloth samples are obtained).

The designer (Hanako Isho) assigned with the personal translation dictionaries shown in FIGS. 10 and 11 specifies the cloth with ambiguous designer's words saying the "silk-like, less-drapey, tensity, and firm", and "wool poplin" and "tropical" are found from textile database 6. Thereafter, when the designer selects "wool poplin", the salesman of the cloth company obtains "wool poplin" of cloth code of 025 from its own stock and immediately delivers it to Hanako Isho in the apparel maker of ID=A001.

If "wool poplin" is out of stock, the salesman searches database 3 of production methods, using a production method code (U4589) corresponding to the "wool poplin" selected by the designer, data for producing the cloth is output, as shown in FIG. 12. When the cloth is to be manufactured based on this production data, the cloth ("wool poplin" of cloth code of 025) desired by the designer (Hanako Isho) can be produced at once without repeatedly producing cloth samples.

FIG. 13 shows how the contents of the feeling expression words used by Hanako Isho (i.e., the designer in the appeal maker of ID=A001) are parsed and analyzed in cloth searching. When a time has elapsed, Hanako Isho who expressed (on Oct. 1, 1992) "wool poplin" as the "silk-like wool which has moderate drape and is tensity and firm" could forget the detailed features of the cloth and the expressions using the designer's words corresponding to the features.

Assume that Hanako Isho forgets the cloth called "wool poplin" but memorizes the image of cloth, and that she orders a cloth using designer's words as "less-drapey, tensity/firm, lustered, rustling, and wool-like" to a salesman of the cloth company. The salesman inputs the features of the cloth in the template shown in FIG. 9, using his own electric note or terminal 20 of the apparel maker, using the designer's words as "less-drapey, tensity/firm, lustered, rustling, and wool-like".

Any cloth which perfectly coincides with the expression as "less-drapey, tensity/firm, lustered, rustling, and wool-like" is not registered in the translation dictionary of Hanako Isho. Even if textile database 6 is searched using this expression, "wool poplin" cannot be retrieved. In this case, Hanako Isho insists that a cloth as "less-drapey, tensity/firm, lustered, rustling, and wool-like" has been registered in her translation dictionary.

The salesman of the cloth company changes a search method. The general feeling expressed by the designer's words can be decomposed into the sense of slight, the sense of touch, the sense of hearing, the sense of smell, and the like. The designer's words used by Hanako Isho saying "less-drapey, tensity/firm, lustered, rustling, and wool-like" is parsed. First of all, as the contents of the sense of sight (outer appearance), the word "less-drapey" can be found and is defined as the first keyword in searching. As the contents of the sense of touch, "tensity/firm" can be found and is used as the second keyword in searching. As the contents of the sense of hearing, "rustling" can be found and is used as the third keyword in searching. In addition, as for the cloth structure, the word "wool-like" can be found and the "wool cloth" is used as the fourth keyword in searching. The word "lustered" can be found and the lustered cloth is used as the fifth keyword in searching.

Even if textile database 6 is searched using all the conditions (AND condition) of the first to fifth keywords, "wool poplin" may not be found. Then, the number of keywords is reduced (i.e., the search conditions are limited). All combinations of arbitrary four of the first to fifth keywords are used to cause the CPU in system controller 7C to search textile database 6, for example. Using the first to fourth keywords (less-drapey, tensity/firm, rustling/silk-like, wool-like/wool/wool fabric), "wool poplin" and "tropical" are found. When cloth samples of both "wool poplin" and "tropical" are presented to Hanako Isho, "wool poplin" is selected.

In this case, when the designer's words saying "less-drapey, tensity/firm, lustered, rustling, and wool-like" are registered (or entered) using the template in FIG. 9, they are additionally registered in the translation dictionary for only Hanako Isho. Thereafter, if Hanako Isho orders a cloth, saying "less-drapey, tensity/firm, lustered, rustling, and wool-like", "wool poplin" can be immediately found. In addition, if Hanako Isho orders a cloth, saying "silk-like wool which has moderate drape and is tensity and firm", "tropical" in addition to "wool poplin" can be found.

FIG. 14 shows another cloth search translation dictionary representing a relationship among feeling expression words, names of corresponding cloths, and corresponding production methods. In this dictionary, the correspondence between the designer's words and the cloth is not registered in the dictionary in advance, unlike in FIGS. 10 and 11. This dictionary of the feeling expression words is prepared in a bottom-up manner.

Assume that designer, Hanako Isho of the apparel maker of ID=A001 is planning to design a given coat. Hanako Isho clearly recognizes the design/image of this coat in her mind, but cannot finally decide an optimal cloth.

In this case, Hanako Isho accesses a data input sheet for searching cloths (FIG. 15) at display 5B of apparel terminal 20A of her own. She inputs "soft" as the feature of cloth as a vague image and selects "soft" and "warm" as character codes corresponding to this designer's word from the impression selection menu with a keyboard or mouse.

The CPU of system controller 7C in FIG. 7 searches local database 6 and/or the textile DB of VAS integration database 100, using the character code of "soft" as the first keyword. Assume that 100 kinds of cloths are found in this first search operation.

The CPU in system controller 7C further searches cloths of the 100 kinds of cloths, using the character code of "warm" as the second keyword. Assume 10 kinds of cloths are found in this second search operation.

When these search operations are completed, a window including a table shown in the upper portion of FIG. 14 is popped up on display 5B of terminal 20. The first two kinds of cloths (melton and flannel) of all the 10 kinds of cloths found on the basis of the combination of two keywords as "soft" and "warm" are displayed in this window. At the same time, the material (wool fabric/wool) of the first cloth candidate (melton) and a code (M8642) of its production method are displayed. The remaining eight cloths can be displayed on the screen of display 5B by scrolling the candidate row in the list of the names of basic cloths with an arrow key of the keyboard.

If a cursor is moved to a desired one of the second to ten candidates of the names of cloths (e.g., flannel as the second candidate), and the return or enter key on the keyboard of terminal 20 is hit, this cloth (flannel) becomes the first candidate. The first cloth (melton) becomes the second candidate (change in candidate).

This change in candidate is registered in the dictionary file for only Hanako Isho which is prepared in storage 2. For example, when the change in candidate is registered at 3:30 pm, May 12, 1993 for the first time, the template on display 5B is changed, as shown in the lower portion of FIG. 14.

When designer, Hanako Isho of the apparel maker of ID=A001, enters "soft" and "warm", "flannel" is searched first. When Hanako Isho searches, selects, and registers (enters) another cloth for "soft" and "warm" as keywords, this cloth is searched first in correspondence with the designer's word as "soft and warm" of Hanako Isho. In this manner, the dictionary file (i.e., a table including the contents of FIG. 14) of a specific person (Hanako Isho of the apparel maker of ID=A001) can perform learning and expansion of the relationship between the designer's words and the corresponding cloths.

When Hanako Isho finds flannel as a result of searching the textile database with designer's words as "soft and warm", she can order the cloth sample of flannel found in the cloth company as the seller. (If this cloth company is a VAS subscriber, this order can be performed by an electronic mail through transmission line 1. In this electronic order, the cloth code, the production method code, and other associated data of flannel as the goods to be ordered can be automatically sent to the order-receiving cloth company.)

Upon reception of the order, if the cloth company has its stock, the cloth of flannel is immediately delivered to Hanako Isho. Even if flannel is out of stock, the cloth sample of flannel can be immediately produced without any trails-and-errors because the production method code (F5792) of flannel is known.

FIG. 16 is a flow chart for explaining a sequence for looking up a translation dictionary of a specific designer, searching a desired cloth from feeling expression words, and producing the cloth in the stage of cloth planning by the given designer. This sequence is executed by the CPU of system controller 7C in FIG. 7. In this case, assume that the dictionary (FIGS. 10 and 11) of Hanako Isho of the apparel maker of ID=A001 is already registered in the user dictionary of storage 2, and that she plans a cloth using a wool material for autumn/winter (step ST10).

Hanako Isho calls the data input sheet as shown in FIG. 9, using apparel terminal 20 of her own, in order to input data for searching cloth. Hanako Isho expresses the contents of the plan of the cloth (image/feeling of cloth) by her own words saying "silk-like wool which has moderate drape and is tensity and firm" and enters it in the column of the "feature of cloth" in the input sheet (step ST12). This input sheet also has the column of a cloth code and other columns. The columns for unknown items are left blanked.

The CPU in system controller 7C parses the designer's words as "silk-like wool which has moderate drape and is tensity and firm" which varies depending on individual differences of expression and translates it into a combination of character codes of the uniform predetermined expressions of feeling (less-drapey, tensity/firm, rustled/silk-like, and wool fabric/wool) (step ST14).

The CPU in system controller 7C searches/finds the "wool poplin" having the production method code of U4589 and the "tropical" having the production method code of T9876 from textile database 6 and/or VAS integration database 100, using the combination of the translated character codes (less-drapey, tensity/firm, rustled/silk-like, wool fabric/wool), with reference to the translation dictionary shown in FIG. 11 (step ST16).

Hanako Isho who operates terminal 20 checks information (e.g., wool poplin and tropical) of more than one searched cloth (step ST18). If the found cloth is not a desired one (NO in step ST20), the code of the expression of feeling which is selected in the template in FIG. 9 is changed to alter the search condition (step ST22). This change in search condition is modification/learning of the personal translation dictionary of Hanako.

When the search condition is altered, the combination of the altered expressions of feeling may not be registered in the personal dictionary (user dictionary in storage 2) of Hanako Isho at this moment. In this case, a general dictionary (i.e., the basic dictionary of storage 2; the dictionary size is much larger than the user dictionary), in which codes corresponding to the altered expressions of feeling are registered as default setting, is looked up to translate the combination of the altered expressions of feeling to a corresponding combination of expression codes (step ST14). After the translation, the textile database is searched on the basis of the combination of the translated expression code (step ST16), and several cloths are found (step ST18).

If one or more cloths (e.g., angora and flannel) found as the result of the above search operation may satisfy the request of Hanako Isho (YES in step ST20), Hanako Isho orders the cloth (e.g., angora) found as the first candidate to the cloth company. If angora is out of stock in the order-receiving cloth company, the cloth of the first candidate (angora sample) is produced (step ST24).

Hanako Isho touches and reviews the sample of the cloth of the first candidate (angora) from the cloth company and checks to match her request (step ST26). If she feels that the sample is different from the cloth of her request (NO in step ST28), Hanako Isho checks the presence/absence of the second candidate. If the second candidate (flannel) is already searched (YES in step ST30), Hanako Isho selects the second candidate and exchanges the first candidate with the selected one (step ST32). This exchange (change in candidate order) is modification/learning of the personal translation dictionary of Hanako Isho.

Hanako Isho can order the cloth (flannel) changed from the second candidate to the first candidate to the cloth company. If the ordered flannel is out of stock, the cloth of the first candidate (flannel sample) is produced (step ST24).

Hanako Isho touches the sample of the cloth of the first candidate (flannel) from the cloth company and checks if it matches her request (step ST26). If she feels that the sample is different from the cloth of her request (NO in step ST28), Hanako Isho checks the presence/absence of the third candidate. If the third candidate does not exit (NO in step ST30), Hanako Isho repeats the operations from step ST12.

If the cloth sample (e.g., flannel) matches the request of Hanako Isho (YES in step ST28), it is checked if the translation dictionary is altered in step ST22 or ST32. If the alteration or modification is detected (YES in step ST34), the personal translation dictionary (user dictionary) of Hanako Isho is renewed by this modification (step ST38), and processing in FIG. 10 is ended. If no modification exits (NO in step ST34), the personal translation dictionary (user dictionary) of Hanako Isho is not modified, and processing in FIG. 16 is ended.

FIG. 17 shows a sequence of preparing translation dictionaries of the respective designers. This sequence is assumed that a goods (cloth) exists first, and the feeling expression words are then associated with this goods.

A salesman of a given cloth company presents or shows 20 standard sample cloths to a customer, i.e., an apparel designer (Hanako Isho) (step ST40). The salesman calls the template (FIG. 9) to terminal 20 or his own electric note. The salesman asks the designer how she feels each shown cloth. That is, the salesman asks the designer to select the designer's favorite words from the thesaurus of words for expressing impression/feeling with respect to the respective sample cloths (step ST42). In the template shown in FIG. 9, the salesman asks Hanako Isho to select the feeling expression words such as "less-drapey and firm" for the wool poplin sample.

In selecting the words for expressing impression/feeling, if appropriate words for expressing impression/feeling for the touched wool poplin are not available in the thesaurus containing the feeling expression words prepared by the cloth company (NO in step ST44), the salesman asks Hanako Isho to express an appropriate feeling expression word and registers it in the thesaurus (step ST46). This thesaurus is stored in storage 2 in FIG. 7.

When an appropriate word for expressing the impression/feeling is additionally registered (YES in step ST44), the salesman asks Hanako Isho to want cloths other than the 20 standard cloths. If cloths other than the 20 standard cloths are requested (YES in step ST48), the salesman shows other cloth samples to Hanako Isho (step ST50) and asks Hanako Isho to select appropriate feeling expression words for these cloths (steps ST42 to ST50).

When feeling expression words for all the desired cloths are selected (NO in step ST48), a designer's personal reference table (FIG. 10) defining a relation between the respective sample cloths and words of impression/feeling selected from the thesaurus is prepared for Hanako Isho by the CPU in system controller 7C (step ST52).

FIG. 18 is a flow chart for explaining a sequence for searching and producing a desired cloth based on feeing expression words with reference to the personal translation dictionary prepared for a specific designer in the stage of planning a cloth by the designer. This sequence is a developed sequence of FIG. 16 and is executed by the CPU in system controller 7C. Assume that the personal dictionary (FIGS. 10 and 11) of Hanako Isho in the apparel maker of ID=A001 is registered in the user dictionary of storage 2.

Hanako Isho plans a specific cloth (step ST60). She calls a template of FIG. 9 in apparel terminal 20 of her own in order to access the data input sheet for searching the cloth. Hanako Isho expresses the contents of the plan (image/feeling of cloth) using designer's words (e.g., warm, soft wool) and enters the features of the cloth in the column of the "feature of cloth". As described with reference to FIG. 17, Hanako Isho selects the expression of feeling and its features (warm and soft) from the thesaurus with respect to the standard image of the cloth (step ST62).

System controller 7C in FIG. 7 translates the expression of feeling (designer's words) used by Hanako Isho for the specific cloth, with reference to the personal translation dictionary (user dictionary of storage 2) of Hanako Isho which is prepared by the sequence shown in FIG. 17 and/or the basic dictionary (storage 2) (step ST64). The translated feeling expression is coded (FIG. 10), and textile database 6 (or VAS textile DB) is searched on the basis of the translated feeling expression codes (step ST66).

As the result of this searching, assume that angora, wool georgette, and flannel shown in FIG. 11 are found. The characteristic feature common to three searched cloths are checked with reference to the relation between the expression of feeling registered in the personal dictionary and the corresponding characteristic features of the three cloths (light/soft/warm/flossy, drapey/soft/massive, light/soft/warm) (step ST68).

If the characteristic feature (soft) common to the three cloths found in the search operation does not coincide with the characteristic features of the feeling expression words of the cloths registered in the personal translation dictionary of Hanako Isho (NO in step ST70), the three searched cloths are determined not to be a desired cloth of Hanako Isho. In this case, the words (warm and soft) used in searching are changed to similar words (e.g., warm or flossy) in the thesaurus of storage 2 to change the search condition. Steps ST62 to ST70 are repeated. The change in search condition is modification/learning of the personal translation dictionary of Hanako Isho.

If the characteristic feature (soft) common to the three cloths found as the result of searching coincides with the characteristic feature (soft) of the expressions of feeling of the cloths registered in the personal translation dictionary of Hanako Isho (YES in step ST70), it is determined that the three searched cloths may include a cloth desired by Hanako Isho. This determination is not made by Hanako Isho but by the CPU in system controller 7C.

Hanako Isho determines whether one of the three cloths (angora, wool georgette, and flannel) found as the result of searching is made or produced (if the stock is available, it is determined whether the cloth is ordered). If the cloth is not produced (or ordered) (NO in step ST74), processing in FIG. 18 is ended.

If the first candidate (e.g., angora) of the three cloths (angora, wool georgette, and flannel) found as the result of searching is to be produced (or ordered) (YES in step ST74), Hanako Isho sends request items to the cloth manufacturer (step ST76), and the cloth of the first candidate (angora having the production method code of A0123) is made or produced (step ST78).

The made (or obtained from the stock) angora is checked by Hanako Isho (step ST80). If Hanako Isho touches the sample and feels that this sample is different from her request (NO in step ST82), she checks the second candidate. If the second candidate (wool georgette) has been searched (YES in step ST84), Hanako Isho selects the second candidate and exchanges the first candidate with the selected one (step ST86). This exchange (change in candidate order) is modification/learning of the personal translation dictionary of Hanako Isho.

Hanako Isho can order the cloth (wool georgette) exchanged as the first candidate. When the ordered wool georgette is out of stock in the order-receiving cloth company, the new first candidate (wool georgette sample) is made (step ST78).

Hanako Isho touches the sample of the first candidate cloth (wool georgette) sent from the cloth company and checks whether the sample matches her request (step ST80). If Hanako Isho feels that the sample is different from her request (NO in step ST82), Hanako Isho checks the presence/absence of the third candidate. If the third candidate (flannel) is available (YES in step ST84), steps ST74 to ST82 are repeated. If Hanako Isho feels that the cloth (flannel) of the third candidate does not match her request (NO in step ST82), and other searched cloths do not exit (NO in step ST84), Hanako Isho repeats the operation from step ST62.

If a cloth sample (e.g., flannel) matches the request of Hanako Isho (YES in step ST82), it is checked in step ST72 or ST86 whether the personal translation dictionary is modified. If the dictionary is modified (YES in step ST88), the personal translation dictionary (user dictionary) of Hanako Isho is renewed by this modification (NO in step ST88). The translation dictionary (user dictionary) of Hanako Isho is modified by this change (step ST90), and processing in FIG. 18 is ended. However, when the translation dictionary is not changed (NO in step ST88), the personal translation dictionary of Hanako Isho is not modified and the processing in FIG. 18 is ended.

When the personal translation dictionary of Hanako Isho is looked up upon the above exchange (learning), a desired cloth (e.g., flannel) can be immediately found without repeating sample production in steps ST74 to ST82.

FIG. 19 shows another sequence for preparing a personal translation dictionary for each designer in advance. This sequence is a developed sequence of FIG. 17. A goods (cloth) exits beforehand, and a feeling expression word is associated with the goods, and another goods (cloth) is then associated with this word.

A salesman of a given cloth company presents or shows 20 standard sample cloths to a customer, i.e., an apparel designer (Hanako Isho) (step ST100). The salesman calls the template (FIG. 9) to terminal 20 or his own electric note. The salesman asks the designer to select the designer's favorite words from the thesaurus of words for expressing impression/feeling with respect to the respective sample cloths (step ST102). The thesaurus is stored in storage 2 in FIG. 7.

In selecting the words for expressing impression/feeling, if appropriate words (e.g., transparent) for expressing impression/feeling for the touched cloth sample (e.g., the second lace from the bottom in FIG. 11) are not available in the thesaurus for the feeling expression words prepared by the cloth company (NO in step ST104), the salesman asks Hanako Isho to express an appropriate feeling expression word (e.g., transparent) and registers it in the thesaurus (step ST106).

When an appropriate word for expressing the impression/feeling is additionally registered (YES in step ST104), the designer's words (transparent and flimsy) corresponding to the feeling of Hanako Isho is caused to correspond to the cloth sample (lace). This correspondence will be additionally registered in the translation dictionary (step ST116).

The salesman asks Hanako Isho to want cloths other than the 20 standard cloths. If cloths other than the 20 standard cloths are requested (YES in step ST108), the salesman shows other cloth samples to Hanako Isho (step ST110) and asks Hanako Isho to select appropriate feeling expression words for these cloths (steps ST102 to ST110).

When feeling expression words for all the desired cloths are selected (NO in step ST108), a designer's personal translation table (FIGS. 10 and 11) defining a relation between the respective sample cloths and words of impression/feeling selected from the thesaurus is prepared for Hanako Isho (step ST112). These operations up to this step are similar to those in FIG. 17.

After preparation of this translation table, if Hanako Isho wants to cause to correspond the combination of feeling expression words (designer's words registered in the translation tables in FIGS. 10 and 11) past selected for, e.g., wool poplin to another cloth, the salesman asks her to select this another cloth (e.g., tropical) (step ST114). Thereafter, the relation between the combination of the words for expressing the impression/feeling past selected for wool poplin and the tropical selected as the corresponding cloth is additionally entered in the personal translation dictionary table of Hanako Isho (step ST116).

FIG. 20 is a learning sequence of the prepared translation dictionary. This sequence is prepared under the assumption that the sensitivity or susceptibility of the designer (Hanako Isho) assigned with the personal translation dictionary is changed between the initial period of dictionary registration and the subsequent search period.

When designer, Hanako Isho of the apparel maker of ID=A001, is to search textile database 6 from terminal 20 of her own, she inputs one or more feeling expression words already entered in the thesaurus (e.g., soft and warm) (step ST120). The CPU in system controller 7C looks up the translation dictionary having the contents shown in FIG. 10 to translate the feeling expression codes corresponding to the feeling expression words (soft and warm) used by Hanako Isho (step ST122).

The CPU in system controller 7C searches textile database 6 on the basis of the translated codes (step ST124). When the flannel found as the result of searching does not match the feeling of Hanako Isho (NO in step ST126), Hanako Isho changes the feeling expression word such as "soft and flossy", i.e., alters or modifies the range of search (search conditions) (step ST128). The modified feeling expression word is translated to another code (step ST122), and the textile database is searched in accordance with the translated feeling expression words (step S124).

Camel hair is found as the result of searching. If this cloth matches the feeling of Hanako Isho (YES in step ST126), the contents of the dictionary table in FIG. 10 can be renewed to correspond to the cloth (camel hair) whose words (soft and warm) are used by Hanako Isho for the first time. (An opportunity for allowing Hanako Isho to decide this renewal may be given in step ST130.)

Figure 21:
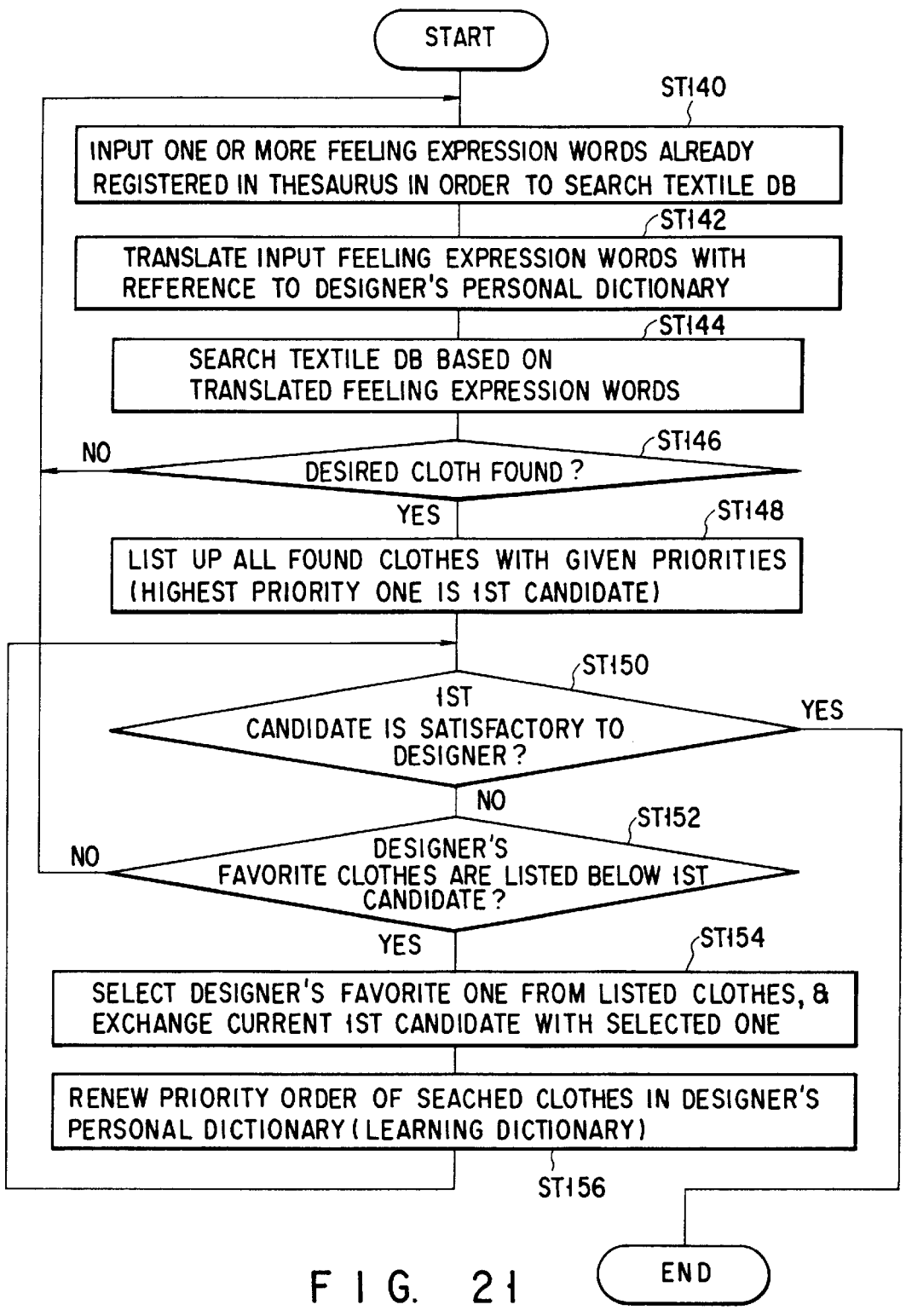
FIG. 21 is a flow chart for explaining another learning sequence of a translation dictionary.

FIG. 21 shows another learning sequence of the prepared translation dictionary.

Designer, Hanako Isho of the apparel maker of ID=A001, inputs one or more feeling expression words registered in the thesaurus of feeling expression words (e.g., soft and hot) stored in storage 2 in order to search textile database 6 from terminal 20 of her own (step ST140). The CPU in system controller 7C looks up the translation dictionary shown in FIG. 14 to translate the feeling expression words (soft and hot) used by Hanako Isho to the corresponding feeling expression codes (step ST142).

The CPU in system controller 7C searches textile database 6 on the basis of the translated codes (step ST144). If no desired cloth is found (NO in step ST146), Hanako Isho modifies the feeling expression words to, e.g., "soft and warm" (step ST140). The modified feeling expression words are converted to other codes (step ST142), and the textile database is searched using the translated feeling expression codes (step ST144).

As the result of searching, assume that melton and flannel are found (YES in step ST146). All found cloths with given priorities are listed up on display 5B of terminal 20 (step ST148). If the first candidate (melton) of the listed cloths is satisfactory to Hanako Isho (YES in step ST150), processing in FIG. 21 is ended.

If the first candidate (melton) of all the listed cloths is not satisfactory to Hanako Isho (NO in step ST150), cloths from the second candidate are checked. If no cloth of all the second and subsequent candidates is satisfactory to Hanako Isho (NO in step ST152), operations from steps ST140 to ST150 are repeated.

If the designer's favorite cloths are listed below the first candidate (YES in step ST152), the favorite cloth (flannel) is exchanged as the first candidate (step ST154). The contents of the dictionary are modified so that the flannel for the feeling expression words for "soft and warm" by Hanako Isho is exchanged as the first candidate (step ST156). In this manner, learning of the personal dictionary of Hanako Isho is performed.

Figure 22:
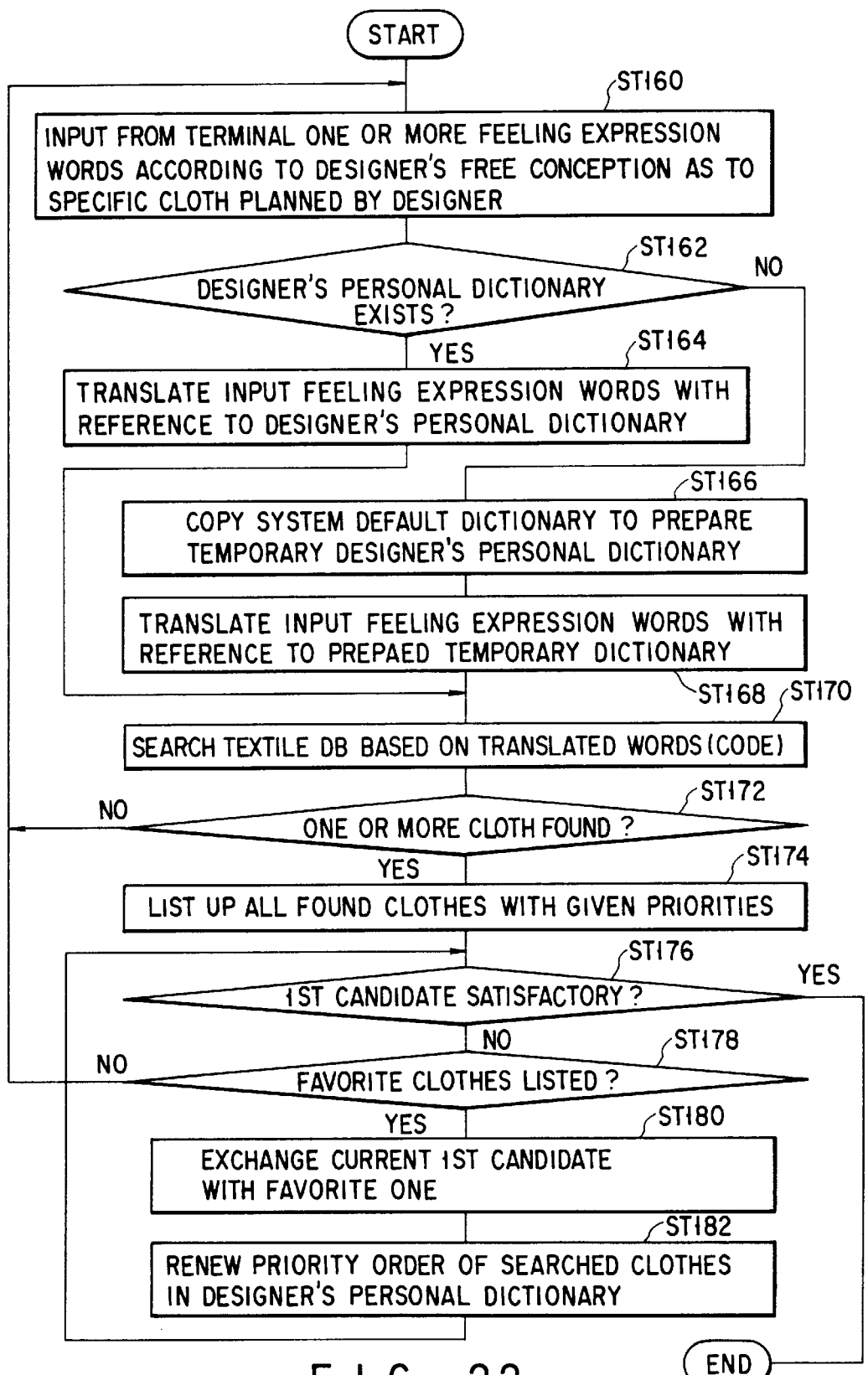
FIG. 22 is a flow chart for explaining still another sequence for preparing a translation dictionary and causing the translation dictionary to learn.

FIG. 22 shows still another sequence of translation dictionary preparation and learning. Assume that designer, Hanako Isho of the apparel maker of ID=A001, inputs one or more feeling expression words for a cloth freely imaged by her at terminal 20 of her own (step ST160). If the personal dictionary file of Hanako Isho is already registered in storage 2 (YES in step ST162), the input feeling expression words are converted to corresponding feeling expression codes with reference to this dictionary file (step ST164).

If the personal dictionary file of Hanako Isho does not exit (NO in step ST162), the dictionary of the system defaults in the basic dictionary of storage 2 is copied to prepare the temporary personal dictionary of Hanako Isho (step ST166). Thereafter, the CPU in system controller 7C translates the input feeling expression words into the corresponding feeling expression codes with reference to the prepared dictionary file (step ST168).

The CPU in system controller 7C searches textile database 6 on the basis of the translated feeling expression codes (step ST170). If a desired cloth is not found by this searching (NO in step ST172), operations in steps ST160 to ST170 are repeated.

If one or more cloths are found by searching in step ST170 (YES in step ST172), all the found cloths are listed up with given priorities on display 5B of terminal 20 (step ST174). Of all the listed cloths, if the first candidate is satisfactory to Hanako Isho (YES in step ST176), processing in FIG. 22 is ended.

If the first candidate of all the listed cloths is not satisfactory to Hanako Isho (NO in step ST176), cloths below the second candidate are checked. If no favorite cloth is found in the second and subsequent cloths (NO in step ST178), steps ST160 to ST176 are repeated.

If the designer's favorite cloth is found from the second and subsequent candidates (YES in step ST178), the current first candidate is exchanged with the favorite one (step ST180). The contents of the dictionary are renewed such that the favorite cloth is exchanged to the first candidate for the feeling expression words of Hanako Isho (step ST182). In this manner, learning of the personal dictionary of Hanako Isho is performed.

Figure 23:
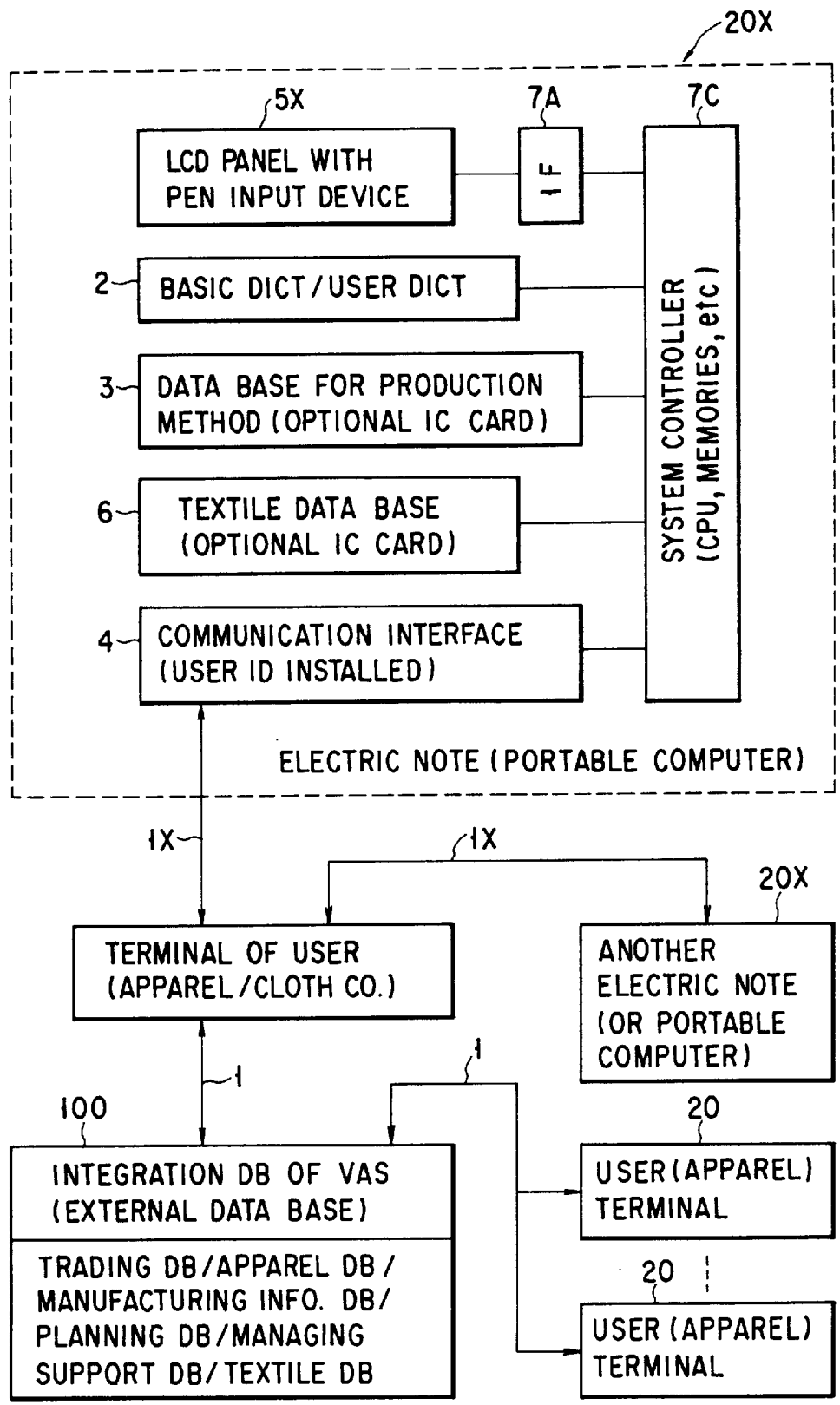
FIG. 23 is a block diagram showing an arrangement to which a sensuous expression translating system according to another embodiment is applied.

FIG. 23 shows an arrangement of a sensuous expression translating system according to another embodiment of the second object of the present invention. In this embodiment, in addition to apparel terminal 20 shown in FIG. 7, an electric note (or compact, lightweight note-type personal computer) 20X having the same functions as those of terminal 20 is used. This electric note 20X is generally carried by a salesman of a cloth company.

The basic arrangement of electric note 20X is the same as that of terminal 20 in FIG. 7. However, electric note 20X has input device 5X, and databases 3 and 6 are formed into IC cards. Translation dictionary data of the respective designers which are prepared by electric note 20X can be recovered to terminal 20 through translation line 1X. If electric note 20X comprises a floppy disk drive, exchange of translation dictionary data can be performed by a floppy disk.

According to the present invention, a translating means for ambiguous feeling expression words is arranged as an expressing means, so that communication between one party (apparel designer) and the other party (cloth salesman/cloth designer) can be properly performed.

In the above description, the apparel business is assumed. However, the present invention is equally applicable to other businesses involving feeling expression words, such as cosmetic business.

According to a sensuous expression translating system, ambiguous feeling expression words (and a combination of a plurality of feeling expression words) having different meanings depending on different users can be translated into words having specific meanings by the personal dictionary (feeling expression codes). Even if the words before translation do not have objective meanings, the translated words (codes representing each representing the correspondence between the goods and information in a one-to-one correspondence) have objective meanings. The translated words eliminate personal differences in usage of words. Therefore, the translated words can be objects for integration processing by a computer, thereby accurately informing the contents of the original feeling expression words to the third party.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A sensuous expression translating system comprising:
   translating means for translating a feeling expression word or sensuous expression capable of representing different meanings depending on different environments into information having a specific meaning;
   storage means for storing translation information for defining a correspondence between the feeling expression word or sensuous expression and an object represented by information translated by said translating means, wherein the translation information stored in said storage means includes:
   personal information specifying a person who uses the feeling expression word or sensuous expression; and
   character information representing the feeling expression word or sensuous expression; and
   a name of the object which is registered in correspondence with the character information; and correcting means for correcting a translation error occurring in the translation information, which error is caused by a difference obtained when the feeling expression word or sensuous expression is different from the object represented by the information translated by said translating means, wherein said translating means translates the feeling expression word or the sensuous expression into the information having the specific meaning based on the translation information corrected by said correcting means.

2. A system according to claim 1, wherein contents of the translation information are modified such that a difference between the character information of the feeling expression word or sensuous expression and the object registered in correspondence with the character information is reduced when the person specified by the personal information determines a difference between the character information of the feeling expression word or sensuous expression and the name of the object which is registered in correspondence with the character information and at least one of the feeling expression word or sensuous expression and the character information is modified.

3. A system according to claim 1, wherein said translating means, said storage means, and said correcting means are arranged in an information processing apparatus used by the specific person who uses the feeling expression word or sensuous expression.

4. A sensuous expression translating system comprising:
  translating means for translating a feeling expression word or sensuous expression capable of representing different meanings depending on different environments into information having a specific meaning;
  storage means for storing translation information for defining a correspondence between the feeling expression word or sensuous expression and an object represented by information translated by said translating means, wherein the translation information stored in said storage means includes:
    personal information specifying a person who uses the feeling expression word or sensuous expression;
    character information representing the feeling expression word or sensuous expression;
    a name of the object which is registered in correspondence with the character information; and
    time information representing a time when the name of the object is registered; and
  correcting means for correcting a translation error occurring in the translation information, which error is caused by a difference obtained when the feeling expression word or sensuous expression is different from the object represented by the information translated by said translating means,
  wherein said translating means translates the feeling expression word or the sensuous expression into the information having the specific meaning based on the translation information corrected by said correcting means.

5. A system according to claim 4, wherein contents of the translation information are modified such that a difference between the character information of the feeling expression word or sensuous expression and the object registered in correspondence with the character information is reduced when the person specified by the personal information determines a difference between the character information of the feeling expression word or sensuous expression and the name of the object which is registered in correspondence with the character information and at least one of the feeling expression word or sensuous expression and the character information is modified.

6. A system according to claim 4, wherein said translating means, said storage means, and said correcting means are arranged in an information processing apparatus used by the specific person who uses the feeling expression word or sensuous expression.

7. A sensuous expression translating system comprising:
  translating means for translating a feeling expression word or sensuous expression capable of representing different meanings depending on different environments into information having a specific meaning;
  storage means for storing translation information for defining a correspondence between the feeling expression word or sensuous expression and an object represented by information translated by said translating means; and
  correcting means for correcting a translation error occurring in the translation information, which error is caused by a difference obtained when the feeling expression word or sensuous expression is different from the object represented by the information translated by said translating means,
  wherein:
    said translating means translates the feeling expression word or the sensuous expression into the information having the specific meaning based on the translation information corrected by said correcting means,
    an independent personal translation dictionary table for each person who uses the feeling expression word or sensuous expression can be additionally registered as the translation information stored in said storage means,
    said personal translation dictionary table includes first information representing at least one predetermined sensuous expression, second information representing at least one predetermined object, and third information representing a correspondence between the predetermined sensuous expression and the predetermined object, and
    said correcting means includes means for, when any one of the predetermined objects is selected by the person using at least one predetermined sensuous expression singly or in a combination of not less than two predetermined sensuous expressions, correcting the correspondence represented by the third information, so that the selected object becomes a top priority for the predetermined sensuous expression used by the person.

8. A system according to claim 7, wherein said translating means, said storage means, and said correcting means are arranged in an information processing apparatus used by the specific person who uses the feeling expression word or sensuous expression.

9. A sensuous expression translating system comprising:
  translating means for translating a feeling expression word or sensuous expression capable of representing different meanings depending on different environments into information having a specific meaning;
  storage means for storing translation information for defining a correspondence between the feeling expression word or sensuous expression and an object represented by information translated by said translating means; and
  correcting means for correcting a translation error occurring in the translation information, which error is caused by a difference obtained when the feeling expression word or sensuous expression is different from the object represented by the information translated by said translating means, wherein:
said translating means translates the feeling expression word or the sensuous expression into the information having the specific meaning based on the translation information corrected by said correcting means, an independent translation dictionary table for each specific person who uses the feeling expression word or sensuous expression is included as the translation information stored in said storage means, said personal translation dictionary table includes first information representing at least one sensuous expression uniquely used by the specific person, second information representing a specific object desired by the specific person, and third information representing a correspondence between the specific sensuous expression and the specific object, and said correcting means includes means for, when the specific person uses at least one sensuous expression not represented by the first information, singly or in a combination of at least two sensuous expressions and designates the specific object, correcting the correspondence represented by the third information, so that the designated object is linked to the sensuous expression used by the specific person.

10. A system according to claim 9, wherein said translating means, said storage means, and said correcting means are arranged in an information processing apparatus used by the specific person who uses the feeling expression word or sensuous expression.

11. A sensuous expression translating system comprising:
translating means for translating a feeling expression word or sensuous expression capable of representing different meanings depending on different environments into information having a specific meaning;

storage means for storing translation information for defining a correspondence between the feeling expression word or sensuous expression and an object represented by information translated by said translating means; and correcting means for correcting a translation error occurring in the translation information, which error is caused by a difference obtained when the feeling expression word or sensuous expression is different from the object represented by the information translated by said translating means, wherein:
said translating means translates the feeling expression word or the sensuous expression into the information having the specific meaning based on the translation information corrected by said correcting means, an independent personal translation dictionary table for a specific person who uses the feeling expression word or sensuous expression is included as the translation information stored in said storage means, said personal translation dictionary table includes first information representing at least one sensuous expression uniquely used by the specific person, second information representing a specific object designated by the specific person, and third information representing a correspondence between the specific sensuous expression and the specific object, and said correcting means includes means for, when the specific person uses at least one specific sensuous expression singly or in a combination of at least two sensuous expressions and designates an object not represented by the second information, adding the information associated with the designated object to the second information and at the same time correcting the correspondence represented by the third information, so that the added information is linked to the sensuous information used by the specific person.

12. A system according to claim 11, wherein said translating means, said storage means, and said correcting means are arranged in an information processing apparatus used by the specific person who uses the feeling expression word or sensuous expression.

13. A sensuous expression translating system comprising:
translating means for translating a feeling expression word or sensuous expression capable of representing different meanings depending on different environments into information having a specific meaning;

storage means for storing translation information for defining a correspondence between the feeling expression word or sensuous expression and an object represented by information translated by said translating means; and correcting means for correcting a translation error occurring in the translation information, which error is caused by a difference obtained when the feeling expression word or sensuous expression is different from the object represented by the information translated by said translating means, wherein:
said translating means translates the feeling expression word or the sensuous expression into the information having the specific meaning based on the translation information corrected by said correcting means, an independent personal translation dictionary table for each specific person who uses the feeling expression word or sensuous expression is included as the translation information stored in said storage means, said personal translation dictionary table includes first information representing at least one sensuous "expression uniquely used by the specific person, second information representing at least one specific object designated by the specific person, and third information representing a correspondence between the specific sensuous expression and the specific object, and said correcting means includes means for, when the specific person uses at least one sensuous expression singly or in a combination of at least two sensuous expressions including at least one sensuous expression not represented by the first information and then the specific person designates at least one object not represented by the second information, adding the used sensuous expression to the first information, adding the information associated with the designated object to the second information, and at the same time, correcting the correspondence represented by the third information so that the added pieces of object information are linked to the sensuous expression used by the specific person.

14. A system according to claim 13, wherein said translating means, said storage means, and said correcting means are arranged in an information processing apparatus used by the specific person who uses the feeling expression word or sensuous expression.

* * * * *